(12) United States Patent
Stark et al.

(10) Patent No.: US 6,939,477 B2
(45) Date of Patent: Sep. 6, 2005

(54) TEMPERATURE-CONTROLLED INDUCTION HEATING OF POLYMERIC MATERIALS

(75) Inventors: Philip Stark, Concord, MA (US); Guy A. Rossi, Hampton, NH (US); Hamid R. Mojazza, Chelmsford, MA (US); Ross Haghighat, Westford, MA (US); Peter Schuler, Westwood, MA (US)

(73) Assignee: Ashland, Inc., Columbus, OH (US)

( * ) Notice: Subject to any disclaimer, the term of this patent is extended or adjusted under 35 U.S.C. 154(b) by 108 days.

(21) Appl. No.: 09/847,055

(22) Filed: May 1, 2001

(65) Prior Publication Data

US 2002/0113066 A1 Aug. 22, 2002

Related U.S. Application Data

(63) Continuation-in-part of application No. 09/562,188, filed on May 2, 2000, now abandoned, which is a continuation-in-part of application No. 09/090,865, filed on Jun. 5, 1998, now Pat. No. 6,056,844.
(60) Provisional application No. 60/048,919, filed on Jun. 6, 1997.

(51) Int. Cl.$^7$ .............................. H01F 1/113; H01F 1/37
(52) U.S. Cl. ..................................... 252/62.54; 524/435
(58) Field of Search ........................ 252/62.54, 62.63, 252/62.62, 52.56; 524/435

(56) References Cited

U.S. PATENT DOCUMENTS

| | | | |
|---|---|---|---|
| 2,393,541 A | 1/1946 | Kohler | 156/272.4 |
| 3,391,846 A | 7/1968 | White | 229/17 |
| 3,461,014 A | 8/1969 | James | 156/272 |
| 3,574,031 A | 4/1971 | Heller, Jr. et al. | 156/273 |
| 3,620,876 A | 11/1971 | Chookazian et al. | |
| 3,638,207 A * | 1/1972 | Smith et al. | 252/62.57 |
| 3,668,176 A * | 6/1972 | Childress | 252/62.54 |
| 3,802,985 A | 4/1974 | Leatherman | 156/244 |
| 4,427,481 A | 1/1984 | Smith et al. | 156/306.6 |
| 4,469,669 A * | 9/1984 | Hibst | 423/594.2 |
| 4,476,184 A | 10/1984 | Lubowitz et al. | 428/288 |
| 4,486,496 A | 12/1984 | Dezawa et al. | 428/328 |
| 4,680,140 A | 7/1987 | Kageyama | 252/512 |
| 4,693,775 A * | 9/1987 | Harrison et al. | 156/272.4 |
| 4,745,264 A | 5/1988 | Carter | 219/553 |
| 4,776,979 A | 10/1988 | Kageyama | 252/512 |

(Continued)

FOREIGN PATENT DOCUMENTS

| | | | |
|---|---|---|---|
| EP | 498998 | * | 12/1990 |
| EP | 0498998 A | | 8/1992 |
| WO | WO 00/03306 A | | 1/2000 |

OTHER PUBLICATIONS

Burnside, S.D. et al., "Synthesis and Properties of New Poly (Dimethylsiloxane) Nanocomposites", Sep. 1995, Chemical Materials, vol. 7, No. 9, pp. 1597–1600.

(Continued)

*Primary Examiner*—C. Melissa Koslow
(74) *Attorney, Agent, or Firm*—Raymond A. Miller; Pepper Hamilton LLP

(57) ABSTRACT

The present invention provides new polymer induction bonding technology. Induction heating technologies are utilized to weld, forge, bond or set polymer materials. The invention provides controlled-temperature induction heating of polymeric materials by mixing ferromagnetic particles in the polymer to be heated. Temperature control is obtained by selecting ferromagnetic particles with a specific Curie temperature. The ferromagnetic particles will heat up in an induction field, through hysteresis losses, until they reach their Curie temperature. At that point, heat generation through hysteresis loss ceases. This invention is applicable to bonding thermoplastic materials, wherein only the area to be heated has ferromagnetic particles in it; bonding of thermoset composites, which have been processed with a layer of thermoplastic material on one side; curing of thermoset adhesives or composite resins; or consolidating thermoplastic composites.

41 Claims, 19 Drawing Sheets

U.S. PATENT DOCUMENTS

| | | | |
|---|---|---|---|
| 4,877,944 A | | 10/1989 | Cowell et al. ............... 219/548 |
| 4,969,968 A | | 11/1990 | Leatherman .............. 156/272.4 |
| 4,987,291 A | | 1/1991 | McGaffigan et al. ........ 219/549 |
| 5,123,989 A | * | 6/1992 | Horiishi et al. .......... 156/272.4 |
| 5,126,521 A | | 6/1992 | McGaffigan ............. 219/10.75 |
| 5,129,977 A | | 7/1992 | Leatherman .............. 156/272.4 |
| 5,133,710 A | | 7/1992 | Carter, Jr. et al. ............. 606/28 |
| 5,134,265 A | | 7/1992 | Dickens et al. ........ 219/10.491 |
| 5,198,053 A | | 3/1993 | Duncan ....................... 156/64 |
| 5,208,443 A | | 5/1993 | McGaffigan ................ 219/505 |
| 5,240,542 A | | 8/1993 | Miller et al. ............. 156/272.4 |
| 5,248,864 A | * | 9/1993 | Kodokian ................... 219/634 |
| 5,272,216 A | | 12/1993 | Clark, Jr. et al. ........... 525/362 |
| 5,278,377 A | | 1/1994 | Tsai ........................... 219/759 |
| 5,294,763 A | | 3/1994 | Chamberlain et al. ...... 219/729 |
| 5,300,750 A | | 4/1994 | Carter, Jr. et al. .......... 219/605 |
| 5,304,269 A | | 4/1994 | Jacaruso ...................... 156/94 |
| 5,340,428 A | | 8/1994 | Kodokian ................ 156/272.2 |
| 5,378,879 A | * | 1/1995 | Monovoukas ............... 219/634 |
| 5,391,595 A | | 2/1995 | Clark, Jr. et al. ........... 523/300 |
| 5,427,846 A | * | 6/1995 | McGaffigan ................ 428/329 |
| 5,481,799 A | | 1/1996 | McGaffigan et al. .......... 29/879 |
| 5,483,043 A | | 1/1996 | Sturman, Jr. et al. ....... 219/647 |
| 5,514,734 A | | 5/1996 | Maxfield et al. ............ 523/204 |
| 5,523,549 A | * | 6/1996 | Tenzer ....................... 219/730 |
| 5,538,581 A | | 7/1996 | Gallant .................... 156/272.4 |
| 5,552,469 A | | 9/1996 | Beall et al. .................. 524/445 |
| 5,554,670 A | | 9/1996 | Giannelis et al. ........... 523/209 |
| 5,603,795 A | | 2/1997 | Paulauskas et al. ...... 156/272.4 |
| 5,643,390 A | | 7/1997 | Don et al. ................ 156/307.1 |
| 5,938,979 A | | 8/1999 | Kambe et al. .............. 252/500 |
| 6,048,599 A | | 4/2000 | Chu et al. ................... 428/114 |
| 6,056,844 A | * | 5/2000 | Guiles et al. ............. 156/272.4 |
| 6,120,856 A | * | 9/2000 | Liberti et al. ............... 427/550 |
| 6,137,093 A | | 10/2000 | Johnson, Jr. ................ 219/634 |

OTHER PUBLICATIONS

Giannelis, E.P., "Polymer Layered Silicate Nanocomposites", Advanced Materials, 1996, pp. 29–35, vol. 8, No. 1, VCH, Weinham, Germany.

Hengzhen S., et al., "Interfacial Effects on the Reinforrcement Propertie of polymer Organoclay Nanocomposites", 1996, pp. 379–384, vol. 28, Elsevier Science BV.

Kojima, Y. et al., "Synthesis of Nylon 6–Clay Hybrid by Montmorillonite Intercalcluate with a–Caprolactam", 1993, Journal of Polymer Science, Part A, vol. 33, pp. 1047–1057, John Wiley & Sons, New York.

Krishnamoorti et al. "Structure and Dynamics of Polymer-Layered Silicate Nanocomposites", Chemcial Metrials, 1996, pp. 1728–1734, vol. 8, No. 8, American Chemical Society.

Lan, T. et al., "Clay–Reinforced Epoxy Nanocomposites", 1994 Chemical Materials, vol. 6, pp. 2216–2219, American Chemical Society.

Muzny, C.D. et al., "Clay Platelet Dispersion in A Polymer Matrix", Materials Letters, Octiober 1996, pp. 379–384, vol. 28, Elsevier Science BV.

Ukrainczyk, L. et al., "Template Synthesis and Characterization of layered Al– and Mg– Silsesquioxanes", 1997, Journal of Physical chemistry, B, vol. 101, No. 4, pp. 5310539, America Chemical Society.

Vaia, R.A. et al., "Microstructural Evolution of Melt Intercalated Polymer—Organically Modified Layered Silicates Nanocomposites", 1996, Chemical Materials, vol. 8, pp. 2628–2635, American Chemical Society.

Vaia, R.A. et al., "Synthesis and Propertie of Two–Dimensional Nanostructures by Direct Intercalculation of polymer Melts in Layered Silicates", 1993, Chemical Materials, vol. 5, pp. 1694–1696, American Chemical Society.

* cited by examiner

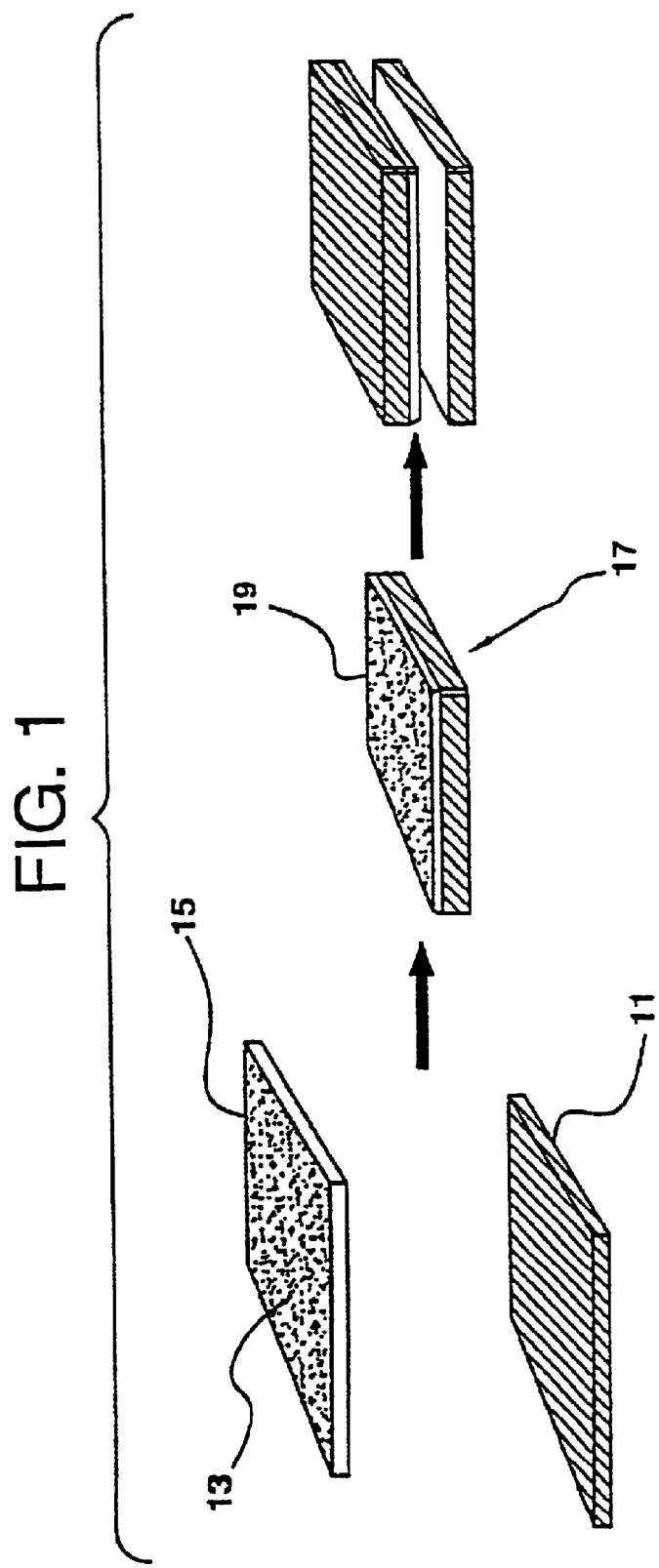

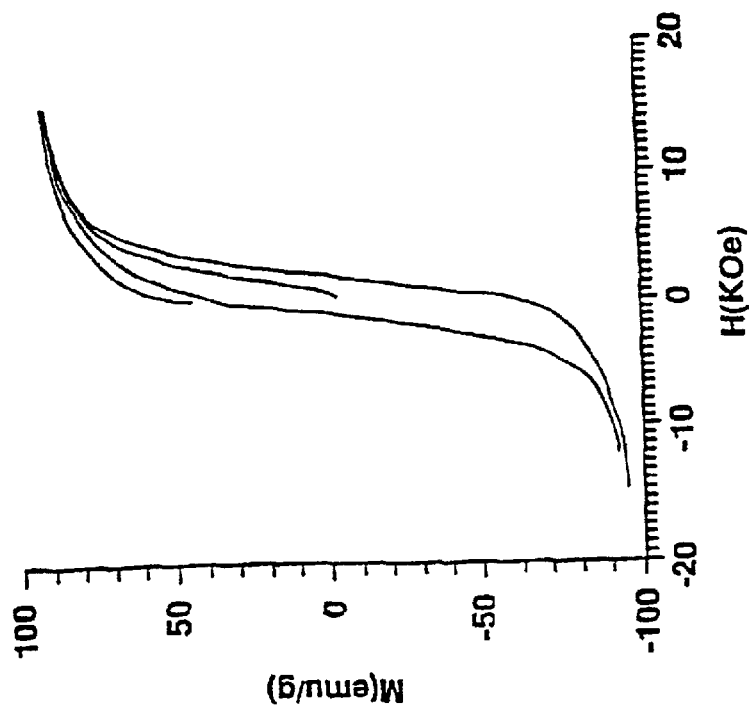
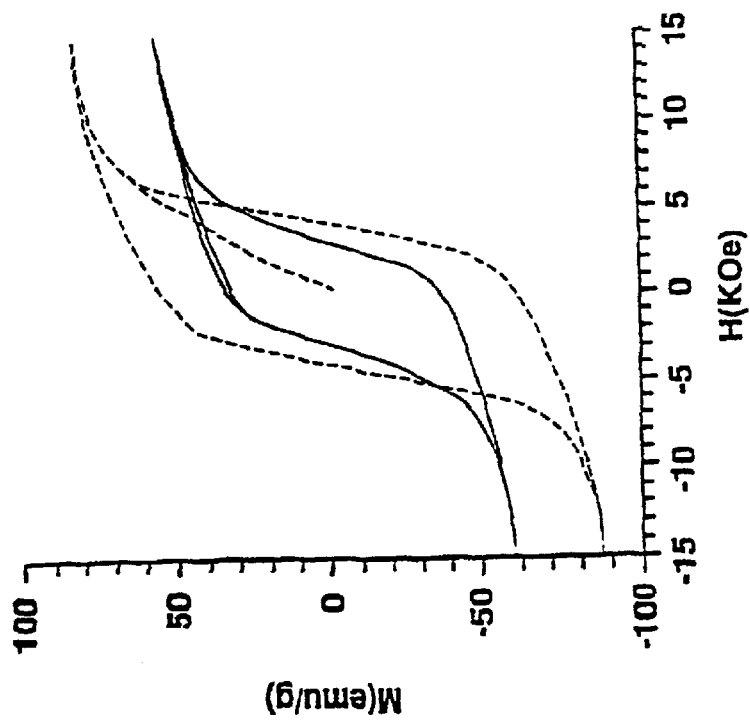
FIG. 2B
FIG. 2A

FIG. 3

Smart Susceptor Test Results

| Material | Type | Geometry | Curie Temp °C | Heating Results 275 kHz | Heating Results 4MHz |
|---|---|---|---|---|---|
| $Co_2Ba_2Fe_{12}O_{22}$ | ferromagnetic | powder | 345 | 60 - 65°C | 340 - 370°C |
| $Fe_3O_4$ (44 micron) | ferromagnetic | powder | 585 | 350°C | 600°C |
| $Fe_3O_4$ (840 micron) | ferromagnetic | powder | 585 | 470°C | not tested |
| $SrFe_{12}O_{19}$ #1 | ferromagnetic | powder | 450 | 60°C | not tested |
| $SrFe_{12}O_{19}$ #2 | ferromagnetic | powder | 450 | 88°C | not tested |

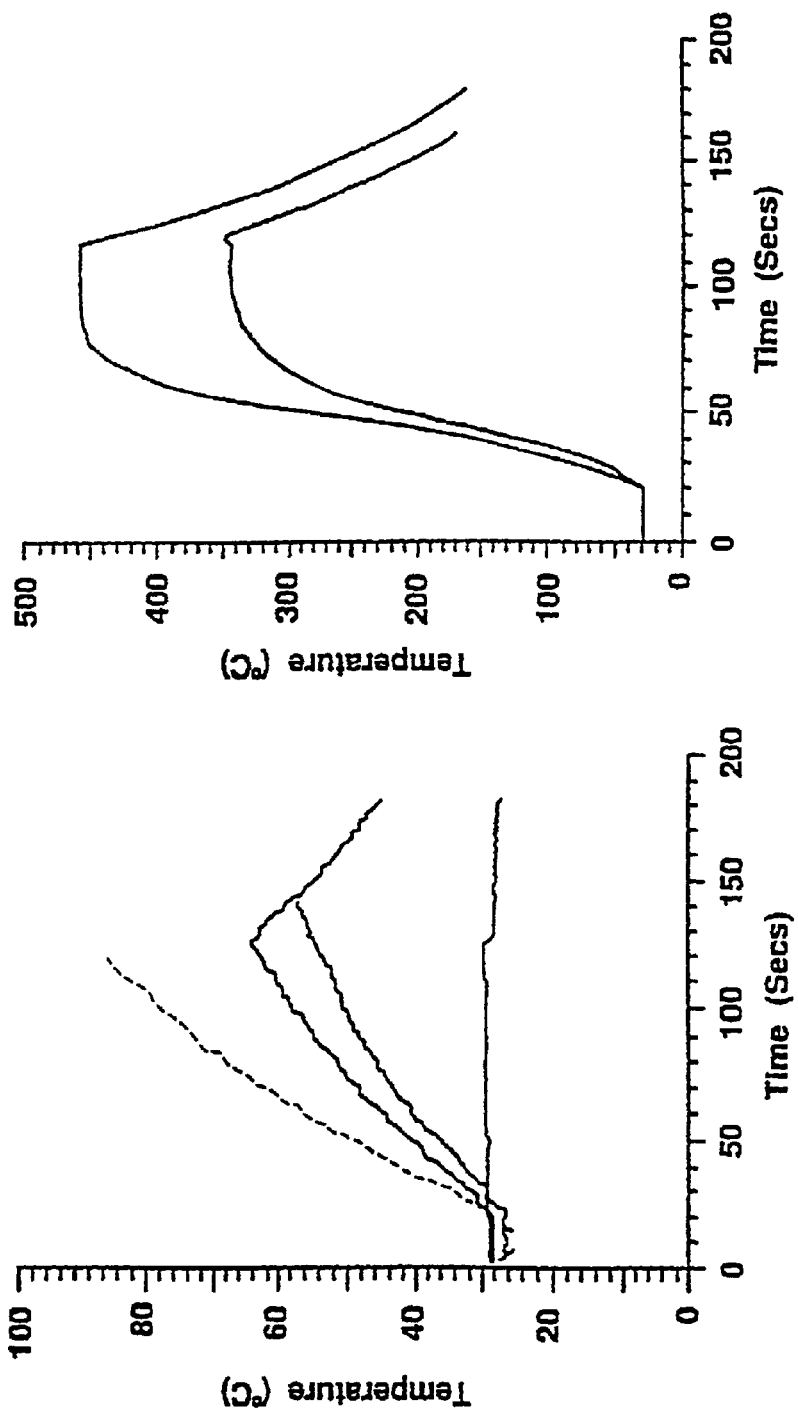

FIG. 5
Smart Susceptor Test Results for Filled Films

| Material | Geometry | Thickness (mils) | Curie Temp °C | Heating Results 275 kHz | Heating Results 4 MHz | Heating Results 6.5 MHz |
|---|---|---|---|---|---|---|
| $SrFe_{12}O_{19}$ #1 | 30 % filled PSF film | 4.0 | 450 | | | 149 °C |
| $SrFe_{12}O_{19}$ #2 (1-2 micron) | 30 % filled PSF film | 4.0 | 450 | | | 343 °C |
| $SrFe_{12}O_{19}$ #2 (1-2 micron) | 30 % filled PSF film | 10.0 | 450 | | | 371 °C |
| $SrFe_{12}O_{19}$ #2 | 30 % filled PSF film | 8.0 | 450 | | | 360 °C |
| $Co_2Ba_2Fe_{12}O_{22}$ | 30 % filled PSF film | 4.0 | 345 | | 109 °C | |
| $Co_2Ba_2Fe_{12}O_{22}$ | 30 % filled PSF film | 8.0 | 345 | | | 249 °C |
| $Co_2Ba_2Fe_{12}O_{22}$ (<1 micron) | 30 % filled PSF film | 4.0 | 345 | | | 243-249 °C |
| $Co_2Ba_2Fe_{12}O_{22}$ (<1 micron) | 30 % filled PSF film | 8.0 | 345 | | | 288-302 °C |
| $Co_2Ba_2Fe_{12}O_{22}$ (<1 micron) | 30 % filled PSF film | 10.0 | 345 | | | 288-302 °C |
| $Fe_3O_4$ (840 micron) | 30 % filled PSF film | 4.0 | 585 | 50 °C | | |
| $Fe_3O_4$ (44 micron) | 10 % filled PSF film | 4.0 | 585 | 38 °C | | |
| $Fe_3O_4$ (44 micron) | 30 % filled PSF film | 4.0 | 585 | 210 °C | | >371 °C |

Susceptor/Polymer Matrix

| Susceptor (T curie) Polymer | | SrF (450C) | Co-2Y (340C) | Mg-2Y (260-280) | Zn/Co-2Y (255C) Note 3 | Zn/Mg-2Y (175C) Note 3 | Soft Ferr (120-350) Note 4 |
|---|---|---|---|---|---|---|---|
| | Workng Temp (note 1) | | | | | | |
| PEEK | 360C | X | X | | | | |
| PEKK | | X | X | | | | |
| PEI | 340C | X | X | | | | |
| PPS | 340C | X | X | | | | |
| PSU | 340C | X | X | | | | |
| PET | 280-300 | | X | | | | |
| Polyester | 280-300 | | X | | | | X |
| MXD6 | 270-280 | | | | | | |
| PA | 220C | | | X | | | X |
| PP | 200-210 | | | X | X | X | X |
| PP/MXD6 | 200-210 | | | X | X | X | X |
| PP/EVOH | 200-210 | | | X | | X | X |
| PE | 190-200 | | | X | | X | X |

Notes:

(1) "Working Temp" of Polymer is approx. 30C above melting temp.
(2) Curie Temps of Zn/Mg and Zn/Co blends vary by concentration of Zn
(3) Curie Temps of soft ferrite vary by choice of ferrite.

FIG. 6

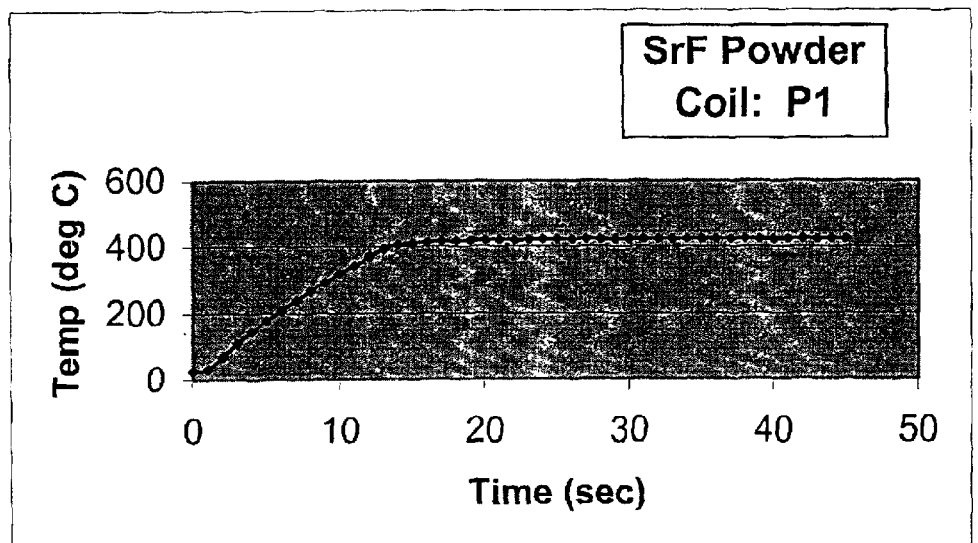
(a)
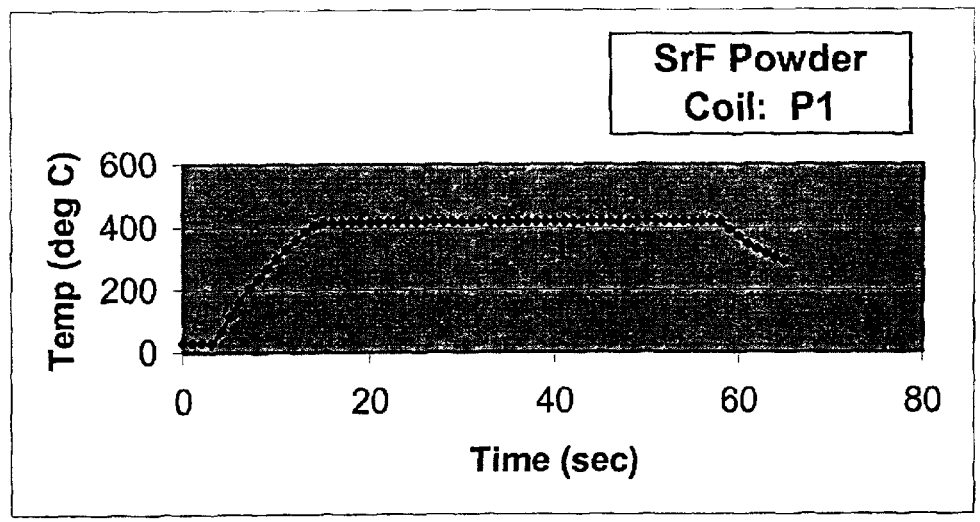
(b)
Figure 11

TEMPERATURE-CONTROLLED INDUCTION HEATING OF POLYMERIC MATERIALS

This application is a continuation-in-part of U.S. application Ser. No. 09/562,188, filed May 2, 2000, now abandoned which is a continuation-in-part of U.S. application Ser. No. 09/090,865, filed Jun. 5, 1998, and issued as U.S. Pat. No. 6,056,844, which claims the benefit of U.S. Provisional Application No. 60/048,919, filed Jun. 6, 1997.

FIELD OF THE INVENTION

The present invention relates to methods of controlled-temperature induction heating of polymeric materials by mixing ferromagnetic particles of particular compositions in the polymer to be heated. Temperature control is obtained by selecting ferromagnetic particles with specific Curie temperatures. The invention also relates to apparatuses for controlled temperature heating.

BACKGROUND OF THE INVENTION

As composite and polymer materials become more widely used in military and commercial vehicles and structures, more reliable and cost effective methods of fabrication and repair are required for those structures. Current needs exist for a more reliable, expedient and cost effective method of joining fiber reinforced composite components and thermoplastic and thermoset polymer components. New bonding methods must be useful in manufacturing as well as amenable to expedient and effective in-the-field repair. State-of-the-art induction heating techniques can provide fast heating and bonding rates, but exhibit poor control of bond-line temperatures achieved.

Additional applications for controlled bonding include sealing of thermoplastic packaging replacing conventional metal foil seals. Close temperature control also benefits other temperature sensitive processes in manufacturing, such as forming of thermoplastics in molding and forming applications, or repair of the same.

There is also a need for heating elements that quickly reach a desired temperature and maintain that temperature without overheating.

SUMMARY OF THE INVENTION

The present invention provides new polymer induction bonding technology, herein referred to as "SmartBond™", to offer a unique solution to the problem of joining fiber reinforced composite components and thermoplastic and thermoset polymer components. Induction heating technologies are utilized to weld, forge, bond or set polymer materials. The invention provides controlled-temperature induction heating of polymeric materials by mixing ferromagnetic particles in the polymer to be heated. Temperature control is obtained by selecting ferromagnetic particles with a specific Curie temperature. The ferromagnetic particles will heat up in an induction field, through hysteresis losses, until they reach their Curie temperature. At that point, heat generation through hysteresis loss ceases. This invention is applicable to bonding thermoplastic materials, wherein only the area to be bonded has ferromagnetic particles in it; bonding of thermoset composites, which have been processed with a layer of thermoplastic material on one side; curing of thermoset adhesives or composite resins; or consolidating thermoplastic components and composites.

Induction heating of a material occurs when an induction coil, which generates a magnetic field, is placed near the material and heats a susceptor, such as a metal screen or powder, within the material to be heated. The invention focuses on improving the induction heating process by: a) optimizing the susceptor design for effective fusion bonding or welding of thermoplastic layers; b) optimizing the method by which the susceptor particles are mixed or placed within a composite matrix; and c) optimizing the power and frequency of the induction device. An innovative susceptor concept is provided. The invention uses ferromagnetic particles, known as "smart susceptors" or "susceptors", which generate heat through hysteresis losses. These innovative susceptors have the unique feature of "turning off" when they reach their Curie temperature.

Ferromagnetism in a ferromagnetic material disappears at the Curie temperature as thermal oscillations overcome the orientation due to exchange interaction, resulting in a random grouping of the atomic particles. When a ferromagnetic material is placed in an electromagnetic field, the hysteresis losses in the material cause its temperature to rise, eventually reaching its Curie temperature. Upon reaching its Curie temperature, the material crystal lattice undergoes a dimensional change, causing a reversible loss of magnetic dipoles. Once the magnetic dipoles are lost, the ferromagnetic properties cease, thus halting further heating.

Among the important parameters in this process are the following:

1) Size and Shape of Hysteresis Loop: The size and shape of the hysteresis loop are controlled by the choice of the susceptor. For example, a magnetically hard ferrite exhibits a larger hysteresis loop than does a magnetically soft ferrite. The larger the hysteresis loop, the greater is the heat that can be generated per cycle. To take advantage of the larger hysteresis loop, the strength of the applied, alternating magnetic field must be sufficiently large to permit the loop to be completely traversed in each cycle (e.g., for the susceptor to reach magnetic saturation).

2) Particle Loading: The amount of ferromagnetic material used is controlled and optimized for the intended application. In the case of a thermoplastic weld material, the volume fraction of the ferromagnetic phase present and the thickness of the weld material play a direct role in the temperature achieved within the thermoplastic polymer.

3) Alternate Heating Mechanisms: Alternate heating mechanisms inherent in the material may provide additional heat. If other induction heating mechanisms exist in the material, such as eddy currents or dielectric losses, and they generate a significant fraction of the total heat, the temperature control of the hysteretic heating of the ferromagnetic material may not be complete; but the rate of heating or other factors may be optimized for the application.

4) Particle Size: The particle size of the ferromagnetic powder used is controlled and optimized for the intended application. Particle size affects heat transfer to the thermoplastic weld material.

5) Particle Shape: The particle shape of the ferromagnetic powder is controlled and optimized for the intended application. Certain shapes may exhibit unique responses to the induction field, and thus optimized heating for the application.

By manipulating these parameters, "smart" ferromagnetic materials are chosen so as to maximize the hysteresis component of heating, thus optimizing control of the temperature during induction heating.

The present invention relates to a composition for controlled temperature induction heating comprising at least one matrix material, e.g., a thermoplastic material, and ferromagnetic hexagonal ferrite particles, wherein the particles have a specific Curie temperature ($T_c$) in the matrix material. In preferred embodiments, the ferromagnetic hexagonal ferrite particles comprise $SrFe_{12}O_{19}$ (hereinafter referred to as "SrF"), $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation. The divalent cation is preferably selected from Mg, Co, Mn and Zn. In especially preferred embodiments, the ferromagnetic hexagonal ferrite particles have the composition SrF, $Co_2Ba_2Fe_{12}O_{22}$ (hereinafter referred to as Co-2Y), $Mg_2Ba_2Fe_{12}O_{22}$ (hereinafter referred to as "Mg-2Y"), $Zn_1Mg_1Ba_2Fe_{12}O_{22}$ (hereinafter referred to as "Zn/Mg-2Y") and $Zn_1Co_1Ba_2Fe_{12}O_{22}$ (hereinafter referred to as "Zn/Co-2Y") or combinations thereof.

The invention also relates to a composition for controlled temperature induction comprising a matrix material, as described above, and magnetically soft ferrite particles, wherein the particles have a specific Curie temperature ($T_c$) in the thermoplastic material. Preferably, the particles have the composition $1Me_bO:1Fe_2O_3$, where $Me_bO$ is a transition metal oxide. Examples of $Me_b$ include Ni, Co, Mn, and Zn. Preferred particles include, but are not limited to: $(Mn, ZnO)Fe_2O_3$ and $(Ni, ZnO)Fe_2O_3$.

The particles can be of any size. However, in certain embodiments it is preferred that the particles are from about 1 micron to about 840 microns. In other embodiments, it is preferred that the particles are less than 1 micron. Similarly, the particles are present in volume percentage from about 1% to about 50%, more preferably from about 10% to about 30%, and most preferably from about 15% to about 20%. The particles may be on a surface of the matrix, or alternatively, embedded in the matrix. In preferred compositions, the Curie temperature is from about 100° to about 450° C.

The matrix material useful for the practice of the present invention preferably comprises any thermoplastic known in the art. In preferred embodiments, the thermoplastic comprises poly(etheretherketone) (PEEK), polyetherketoneketone (PEKK), poly(etherimide) (PEI), polyphenylene sulfide (PPS), poly(sulfone) (PSU), polyethylene terephthalate (PET), polyester, polyamide (PA), polypropylene (PP), polyurethane (PU), polyphenylene oxide (PPO), polycarbonate (PC), PP/MXD6 (MXD6 is a Mitsubishi trademark for a type of polyamide or nylon), PP/ethylene vinyl alcohol (EVOH), polyethylene (PE), or combinations thereof.

In certain compositions, the $T_c$ of the particles is less than the melting temperature of the matrix material. These compositions are useful when it is desirable to heat the matrix close to the $T_c$ without melting the matrix. In other embodiments, $T_c$ of the particles is greater than the melting temperature of the thermoplastic material. These compositions are useful when it is desirable to melt the matrix material, for example, for sealing or bonding thermoplastic materials.

The invention further relates to a method of controlled temperature heating of a thermoplastic material comprising: (a) providing ferromagnetic hexagonal ferrite particles having the composition SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation, in a first thermoplastic material, wherein the particles have a specific Curie temperature ($T_c$) in the first thermoplastic material; (b) applying an alternating magnetic field to the first thermoplastic material to heat the magnetic particles; and, (c) ceasing heating of magnetic particles when the magnetic particles reach their Curie temperature. The divalent cation is preferably selected from Mg, Co, Mn and Zn. In especially preferred embodiments, the ferromagnetic hexagonal ferrite particles have the composition SrF, Co-2Y, Mg-2Y, Zn/Co-2Y, or Zn/Mg-2Y or combinations thereof.

The invention also relates to a method of controlled temperature heating of a thermoplastic material comprising: (a) providing soft ferrite particles, having the structure $1Me_bO:1Fe_2O_3$, where $Me_bO$ is a transition metal oxide, in a first thermoplastic material, wherein the particles have a specific Curie temperature ($T_c$) in the first thermoplastic material; (b) applying an alternating magnetic field to the first thermoplastic material to heat the magnetic particles; and, (c) ceasing heating of magnetic particles when the magnetic particles reach their Curie temperature. Examples of $Me_b$ include Ni, Co, Mn, and Zn. Preferred particles include, but are not limited to: $(Mn,ZnO)Fe_2O_3$ and $(Ni, ZnO)Fe_2O_3$, also referred to as MnZn and NiZn ferrites, respectively.

In certain embodiments of such methods, $T_c$ of the particles is less than the melting temperature of the thermoplastic material. In other embodiments, $T_c$ of the particles is greater than the melting temperature of the thermoplastic material, and the alternating magnetic field is applied so that the magnetic particles melt the first thermoplastic material.

In certain embodiments, these methods further comprise the step of providing a second thermoplastic material in contact with the first thermoplastic material before applying the alternating magnetic field. In yet other embodiments, the method further comprises initially placing the first thermoplastic material on an uncured or partially cured thermoset material and bonding the thermoplastic material and the thermoset material while curing the thermoset material.

In certain embodiments, the method further comprises initially juxtaposing the first thermoplastic material on the thermoset material, bonding the thermoplastic to the thermoset while curing the thermoset material, and juxtaposing the bonded assembly with the second material. In certain embodiments, the second material is a second thermoset material with a second thermoplastic material and the bonding comprises flowing and bonding the first and second thermoplastic materials while curing the thermoset material. The second material is preferably a second thermoplastic material and can have a different chemical composition than the first thermoplastic material. The second thermoplastic material can optionally have magnetic particles embedded therein. The particles can be in contact with the first and/or second thermoplastic material, as is known in the art. For example, the particles may be embedded in adjacent surfaces of the first and/or second thermoplastic materials, on the surfaces or dispersed throughout the material. The particles for use in this method are preferably from about 1 micron to about 840 microns or alternatively, less than 1 micron.

The method of controlled temperature heating of a thermoplastic material further comprises the step of applying a shifting, e.g., alternating, magnetic field at a frequency from about 80 KHz to about 30 MHz, preferably from about 200 KHz to about 30 KHz. In certain embodiments, it may be preferable to use a frequency from about 500 to about 2 MHz, or from about 2 MHz to about 10 MHz. Yet other embodiments of the present methods further comprise a pretreatment step, which comprises aligning the dipoles of the ferromagnetic particles before applying the alternating induction field. In these methods, applying an alternating magnetic field comprises applying a field to orient the dipoles of the ferromagnetic particles. Certain embodiments of the invention further comprise varying the amount of zinc in the ferromagnetic hexagonal ferrite particles, e.g., Zn/Mg-2Y or Zn/Co-2Y particles, to control the Curie temperature of the particles.

The present invention also relates to a method for preparing a material for controlled temperature heating of a material containing ferromagnetic particles, which have magnetic dipoles, the method comprising aligning the dipoles of the ferromagnetic particles prior to heating the material. In this method, the step of aligning the dipoles of the ferromagnetic particles comprises applying a first induction field to align the dipoles parallel to the first magnetic field and the step of heating the material comprises applying a second induction field oriented in the same direction as the dipoles of the ferromagnetic particles. In certain preferred methods of preparing a material, the ferromagnetic particles comprise ferromagnetic hexagonal ferrites having the composition SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation. The divalent cation is preferably selected from Mg, Co, Mn and Zn. In especially preferred embodiments, the ferromagnetic hexagonal ferrite particles have the composition SrF, Co-2Y, Mg-2Y, Zn/Co-2Y, or Zn/Mg-2Y or combinations thereof (e.g., $SrFe_{12}O_{19}$, $Co_2Ba_2Fe_{12}O_{22}$, $Mg_2Ba_2Fe_{12}O_{22}$, $Zn_1Mg_1Ba_2Fe_{12}O_{22}$, and $Zn_1Co_1Ba_2Fe_{12}O_{22}$). In other preferred methods of preparing a material, the ferromagnetic particles comprise soft ferrite particles having the composition $1Me_bO:1Fe_2O_3$, where $Me_bO$ is a transition metal oxide. Examples of $Me_b$ include Ni, Co, Mn, and Zn. Examples of preferred compounds comprise: $(Mn,ZnO)Fe_2O_3$ and $(Ni,ZnO)Fe_2O_3$, also referred to as MnZn and NiZn ferrites, respectively.

The invention further relates to an apparatus for heating a thermoplastic material comprising ferromagnetic hexagonal ferrite particles or magnetically soft ferrite particles, as described herein, wherein the particles have a specific Curie temperature ($T_c$), and wherein the particles are in contact with the thermoplastic material; an inductor for heating the particles to their Curie temperature, and a power source connected to the inductor. In certain embodiments of the apparatus, the power source provides an alternating field of from about 200 KHz to about 30 MHz to the inductor, and the frequency of the field is selected to optimize the efficiency and rate of heating, as described further below. For example, in certain embodiments for warming food, the inductor preferably operates at a power between 1500 W–2300 W and a frequency of 88 kHz–310 kHz.

Preferred particles for use in the apparatuses and methods of the present invention are from about 1 micron to about 840 microns, or alternatively, the particles can be less than 1 micron. The $T_c$ of the particles is preferably less than the melting temperature of the thermoplastic material, when it is desired only to heat the thermoplastic without melting it. Or, the $T_c$ of the particles can be greater than the melting temperature of the thermoplastic material, if it is desirable to melt the thermoplastic.

In certain apparatuses of the present invention, the thermoplastic material comprises a shaped polymeric material. In yet other embodiments, the shaped polymeric material further comprises a layer of distinct material laminated to the shaped polymeric material. As stated previously, the thermoplastic material can be selected by those of ordinary skill in the art, based upon the application. Examples of useful thermoplastic materials include, but are not limited to, PEEK, PEKK, PEI, PPS, PSU, PET, polyester, PA, PP, PP/MXD6, PP/EVOH, PE, PU, PPO, PC, or combinations thereof. The polymeric material can be shaped by methods known in the art, such as extrusion, compression molding or film casting. The ferromagnetic particles can be embedded in the surface of the thermoplastic material, or dispersed throughout the thermoplastic material.

The present invention also relates to a method of controlling the temperature of a polymeric material comprising (a) providing at least one polymeric material, (b) heating the polymeric material, (c) dispersing in the polymeric material magnetic particles having the composition SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation or soft ferrite particles having the composition $1Me_bO:1Fe_2O_3$, where $Me_bO$ is a transition metal oxide, wherein the particles have a specific Curie temperature ($T_c$) in the polymer material, (d) forming the polymeric material, (e) applying an alternating magnetic field to the polymeric material, (f) heating the ferromagnetic particles and heating the polymeric material with hysteresis losses from the ferromagnetic particles, (g) continuing the applying of the alternating field and (h) ceasing heating of ferromagnetic particles when the ferromagnetic particles reach Curie temperature. The step of applying comprises applying an alternating magnetic field at about 200 KHz to about 30 MHz, preferably from about 500 KHz to about 10 MHz. In certain embodiments, the method further comprises varying the amount of zinc in the ferromagnetic particle to control the Curie temperature of the particles.

The invention further relates to a susceptor for inclusion in a matrix for heating the matrix to a desired Curie temperature comprising a ferromagnetic hexagonal ferrite particle having the composition SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation or soft ferrite particles having the composition $1Me_bO:1Fe_2O_3$, where $Me_bO$ is a transition metal oxide. In certain susceptors of the present invention, the Curie temperature is changed by varying proportions of zinc in the composition. Preferably, the divalent cation $Me_a$ is selected from Mg, Co, Mn and Zn. In especially preferred embodiments, the ferromagnetic hexagonal ferrite particles have the composition SrF, Co-2Y, Mg-2Y, Zn/Co-2Y, or Zn/Mg-2Y or combinations thereof. Examples of $Me_b$ include Ni, Co, Mn, and Zn. Examples of preferred soft ferrite susceptors include $(Mn,ZnO)Fe_2O_3$ and $(Ni,ZnO)Fe_2O_3$.

The invention also relates to a composite comprising a matrix and a susceptor included in the matrix for heating the matrix to a desired Curie temperature, wherein the susceptor comprises ferromagnetic hexagonal ferrite particles or magnetically soft ferrite particles as described herein. In certain composites of the present invention, the Curie temperature is changed by varying proportions of zinc in the composite. In preferred composites, the matrix comprises a thermoplastic material as described herein.

The invention also relates to a bonding thermoplastic comprising ferromagnetic hexagonal ferrite particles having the composition SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation or soft ferrite particles having the composition $1Me_bO:1Fe_2O_3$, where $Me_bO$ is a transition metal oxide, dispersed in a thermoplastic matrix. In certain bonding thermoplastics of the present invention, the Curie temperature is changed by varying proportions of zinc in the particles. In preferred bonding thermoplastics, the thermoplastic matrix comprises PEEK, PEKK, PEI, PPS, PSU, PET, polyester, PA, PP, PP/MXD6, PP/EVOH or PE, PU, PPO, PC, or combinations thereof. In some embodiments, the particles are dispersed throughout matrix, whereas, in others the particles are dispersed on a surface of the matrix.

The invention also relates to an apparatus for heating materials comprising: a heating element having a shaped polymeric matrix; susceptors dispersed in the matrix, wherein the susceptors heat the element to a predetermined Curie temperature upon application of an alternating, i.e., shifting, magnetic field; and an inductor for inducing, or generating, a magnetic field. This apparatus of the present invention can be used for many different types of applications. For example, in one embodiment the materials are liquids or solid foods and the apparatus is useful for heating the material to a desired temperature. In such embodiments, the heating element can be shaped to be used as cookware. It may also be desirable to have an apparatus, which further comprises a layer of a distinct material laminated to the shaped matrix. The inductor can operate at any frequency and power that is required for a particular application. For example, in certain embodiments, the inductor operates at a power between 1500 W–2300 W and has a frequency of 88 kHz–310 kHz. In other embodiments, this apparatus of the present invention is useful for warming parts of a person's body, e.g., hands or feet. In such embodiments, the matrix is shaped to provide contact with the hands or feet, e.g., to be slipped into boots, mittens or gloves. In such embodiments, it may be useful to have the matrix made from a material that will retain the heat for a certain period of time so that the material, whether it be food, liquid, or a person's hands or feet, will continue to be warmed after the inductor does not produce a magnetic field.

The invention also relates to a sealable apparatus comprising: a first element having a shaped matrix and having a rim; a second element having an annular area for bonding to the rim of the first element, and susceptors disposed in the rim of the first element or in the annular area of the second element, for heating the rim or the annular area to a predetermined Curie temperature upon application of an alternating magnetic field, for bonding the first element and the second element together. In certain embodiments, the susceptors are disposed in both the rim and the annular area. As described above, the matrix preferably comprises a thermoplastic material.

The invention also relates to a method of manufacturing a heating apparatus comprising: (a) providing a matrix resin, (b) providing a susceptor that has a predetermined Curie temperature, (c) compounding the resin with the susceptor, and (d) forming the compound into the desired shape. In certain preferred methods of manufacturing, the method further comprises preconditioning the apparatus to reach the desired temperature, wherein the preconditioning step comprises providing a magnetic field to the apparatus prior to use. In these methods, the susceptors have particular magnetic domains and the magnetic field orients the domains into a preferred orientation. The compound is formed into the shape of a cup to hold a food or liquid. In other methods, the compound is shaped into a flat shape, e.g., a disk.

These and further and other objects and features of the invention are apparent in the disclosure, which includes the above and ongoing written specification, with the claims and the drawings.

BRIEF DESCRIPTION OF THE DRAWINGS

FIG. 1 depicts one method of bonding composites using "smart" susceptors.

FIGS. 2A and 2B show hysteresis loops for $SrFe_{12}O_{19}$#1 and $SrFe_{12}O_{19}$#2 and $Co_2Ba_2Fe_{12}O_{22}$ powders.

FIG. 3 summarizes the test results on various powders at 275 kHz and 4 MHZ induction machines.

FIGS. 4A and 4B show time temperature curves for various powders at 275 kHz.

FIG. 5 summarizes the test results on various filled polysulfone film "smart susceptors."

FIG. 6 is a table of several susceptor/polymer matrices.

FIG. 11 is a graph showing SrF (strontium ferrite) powder pre-treated by induction heating to $T_c$. FIG. 11(a) shows a second heating by induction: Rate of heating: 27° C./sec. FIG. 11(b) shows reheating a third time by induction: Rate of heating: 32° C./sec.

DETAILED DESCRIPTION OF THE PREFERRED EMBODIMENTS

Figure 7:
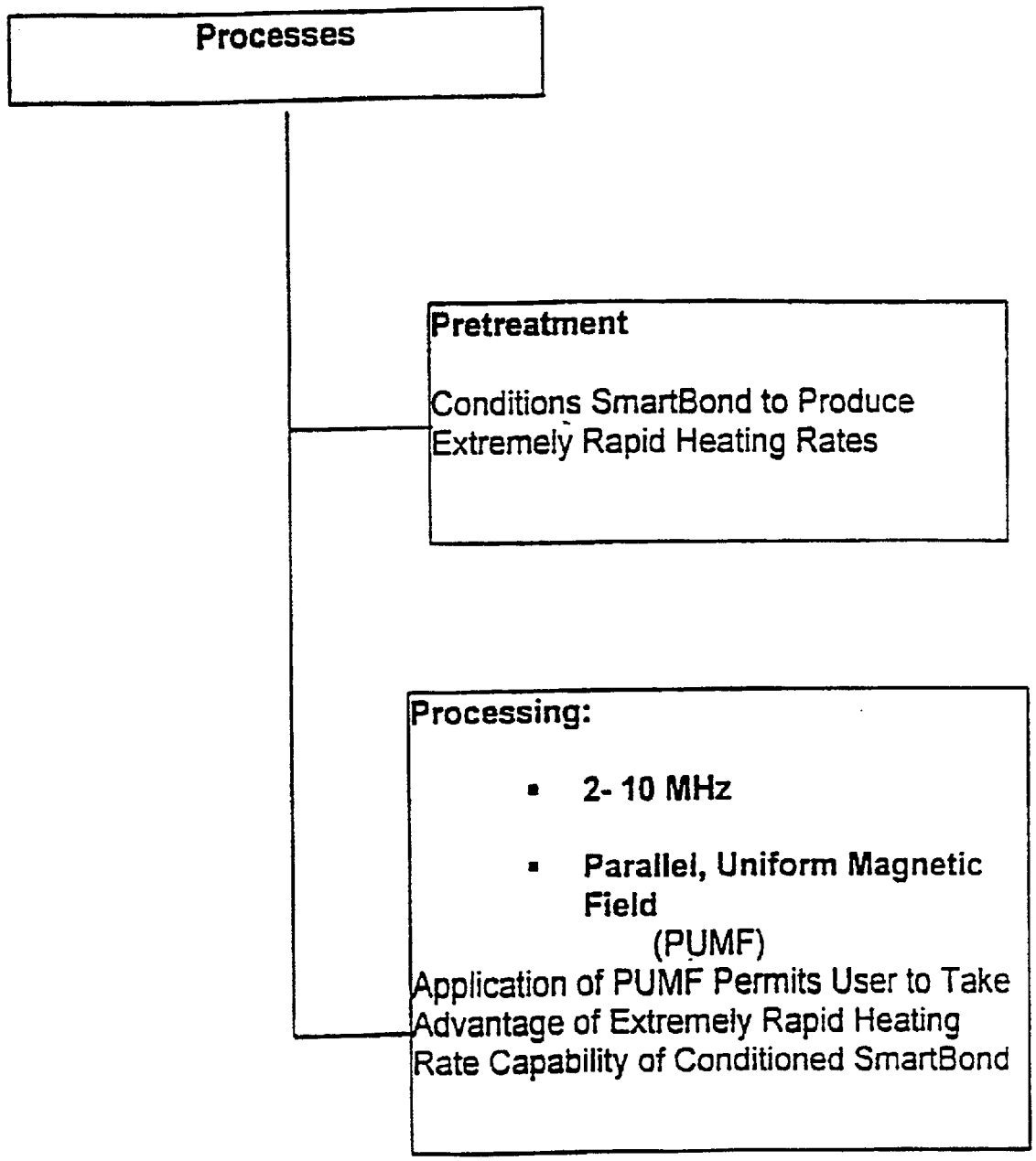
FIG. 7 is a diagram of pretreatment and process variables for temperature-controlled induction heating of polymeric materials.

The methods and apparatus of the present invention are based on the use of preferred ferromagnetic particles as "susceptors" that can be embedded in a polymer matrix. The "susceptors" are "tuned" to a magnetic field to quickly heat to a constant, maximum temperature and are designed to heat only up to their Curie temperature ($T_c$). By adjusting the Curie temperature of these particles in relation to the softening point of the matrix in which they are embedded, the degree of heating and/or bonding of the matrix can be controlled. In the presence of an electromagnetic field, the susceptor particles in the matrix heat rapidly to the predetermined Curie temperature. Once the Curie temperature of the particles is reached, the particles' magnetic properties change, causing the material to stop heating. This built-in thermostatic control offers a powerful means of avoiding overheating with very precise temperature control.

FIG. 1 shows one method of the present invention for induction heating, which provides a unique methodology for bonding of plastics, such as thermosets and thermoplastics and composites thereof. In this example, a fiber reinforced thermoset matrix composite material 11 is co-cured with a thin layer of a thermoplastic material 15 containing ferromagnetic particles 13. During processing, a "co-cure" occurs between the thermoplastic (TP) and thermoset (TS) materials across the TP/TS interface, resulting in a strong bond between the two. The cured thermoset composite material 17 has a thermoplastic layer 19 which may subsequently be fusion bonded to another thermoplastic material or to another thermoset material co-cured with a thermoplastic layer.

Preferential heating of the thermoplastic bond area during fusion is achieved by induction heating of a susceptor material, e.g., particles, 13 placed in the bond interface. This technology is amenable to rapid field repair of composite structures, for example, and is more cost effective in initial fabrication than presently known methods of repair.

Susceptors

The methods and compositions of the present invention utilize the fact that magnetic induction heating occurs in magnetic or electrically conductive materials when they are subject to an applied alternating magnetic field. When a current-carrying body, or coil, is placed near another conductor, or susceptor material 13, the magnetic field caused by the current in the coil induces a current in the susceptor. In electrically conductive magnetic materials, heating occurs by both eddy current and hysteresis losses. It is eddy currents losses that dominate. In non-conducting magnetic materials, heating occurs by hysteresis losses. In this later case, the amount of energy available for heating is proportional to the area of flux vs. field intensity hysteresis curve (B vs. H) and frequency of the alternating field. This mechanism exists as long as the temperature is kept below the Curie point ($T_c$) of the material. At the Curie point, the originally magnetic material becomes non-ferromagnetic. Thus, at its $T_c$ heating of the magnetic material ceases.

The methods of the present invention enable the user to tailor temperature of the composition by selecting the appropriate susceptor based upon the desired application. For example, in certain compositions, the $T_c$ of the particles is less than the melting temperature of the matrix material. These compositions are useful when it is desirable to heat the matrix close to the $T_c$ without melting the matrix. In other embodiments, $T_c$ of the particles is greater than the melting temperature of the thermoplastic material. These compositions are useful when it is desirable to melt the matrix material, for example, for sealing or bonding thermoplastic materials.

Preferred susceptors for use in the present invention comprise hexagonal ferrites and examples include compounds that have the following general structures: SrF, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation. The divalent cation is preferably selected from Mg, Co, Mn and Zn. Thus, examples of susceptors include, but are not limited to those shown in Table 1:

TABLE 1

| Me-2W | Me-2Y | Me-2Z |
|---|---|---|
| $Co_2Ba_1Fe_{16}O_{26}$ | $Co_2Ba_2Fe_{12}O_{22}$ | $Co_2Ba_3Fe_{24}O_{41}$ |
| $Co_1Zn_1Ba_1Fe_{16}O_{26}$ | $Co_1Zn_1Ba_2Fe_{12}O_{22}$ | $Co_1Zn_1Ba_3Fe_{24}O_{41}$ |
| $Mg_2 Ba_1Fe_{16}O_{26}$ | $Mg_2Ba_2Fe_{12}O_{22}$ | $Mg_2 Ba_3Fe_{24}O_{41}$ |
| $Mg_1Zn_1Ba_1Fe_{16}O_{26}$ | $Mg_1Zn_1Ba_2Fe_{12}O_{22}$ | $Mg_1Zn_1 Ba_3Fe_{24}O_{41}$ |
| $Mn_2 Ba_1Fe_{16}O_{26}$ | $Mn_2Ba_2Fe_{12}O_{22}$ | $Mn_2 Ba_3Fe_{24}O_{41}$ |
| $Mn_1Zn_1Ba_1Fe_{16}O_{26}$ | $Mn_1Zn_1Ba_2Fe_{12}O_{22}$ | $Mn_1Zn_1 Ba_3Fe_{24}O_{41}$ |

See L. L. Hench and J. K. West: "Principles of Electronic Ceramics" (John Wiley & Sons, 1990) pp. 321–325. The ferromagnetic hexagonal ferrites are also known as hexagonal ferromagnetic oxides. Examples of preferred ferromagnetic hexagonal ferrites include SrF, Co-2Y and Mg-2Y. A range of Curie temperatures is preferred for the susceptors to be effective in bonding and other processing of a wide range of thermoplastic and thermoset composites.

In certain embodiments of the present invention, the Curie temperature of the susceptor changes in response to changing the proportion of zinc in the susceptors, such as Zn/Mg-2Y and Zn/Co-2Y. For example, $T_c$ may be lowered by the partial substitution of $Zn^{++}$ for the divalent ions in the SrF, Mg-2Y, and Co-2Y. The substitution of $Zn^{++}$ for $Mg^{++}$ and $Co^{++}$ on "a" sites in the lattice reduces the strength of a-b interactions and decreases $T_c$. Preferably, sufficient zinc is added to the magnetically hard hexagonal ferrite to lower its $T_c$ significantly while still retaining its hexagonal structure and hard magnetic properties. One of ordinary skill in the art can readily determine the amount of zinc to be added and the methods for adding it.

Figure 18:
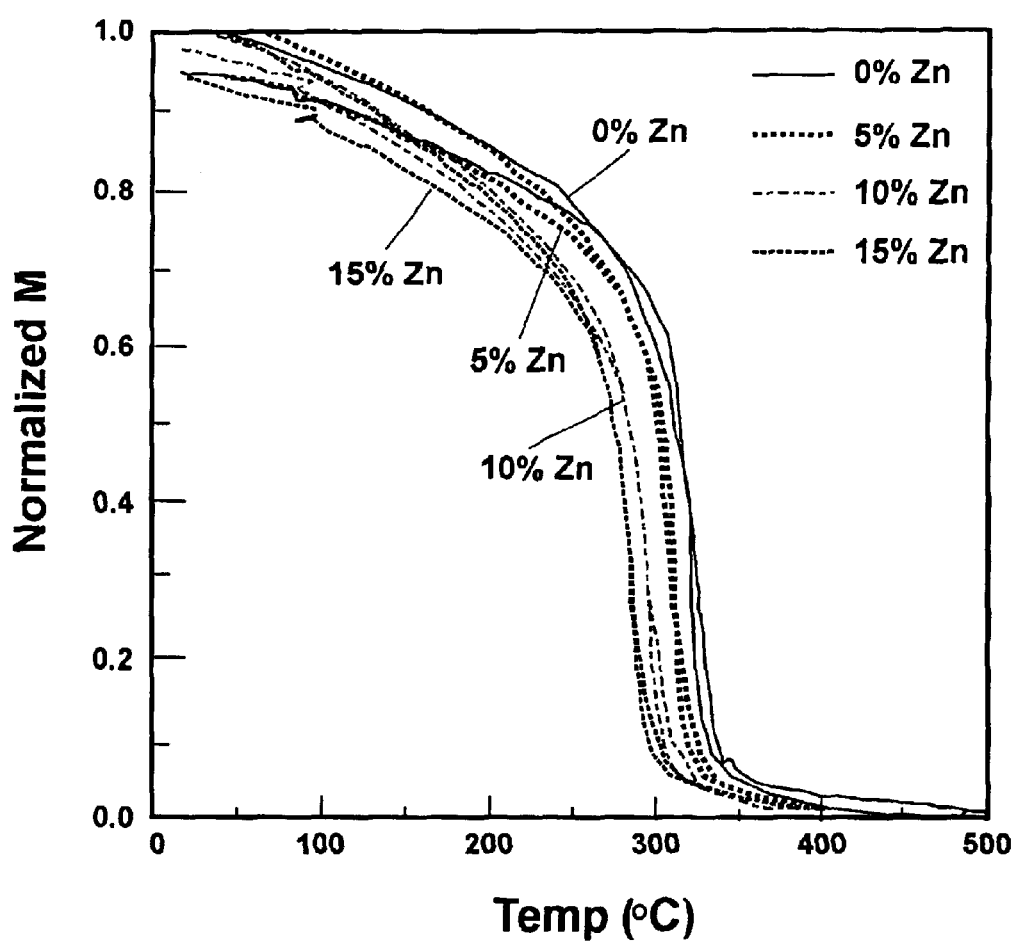
FIG. 18 shows a magnetization vs temperature curve for Co-2Y containing 0, 5, 10 and 15% Zn.
Figure 19:
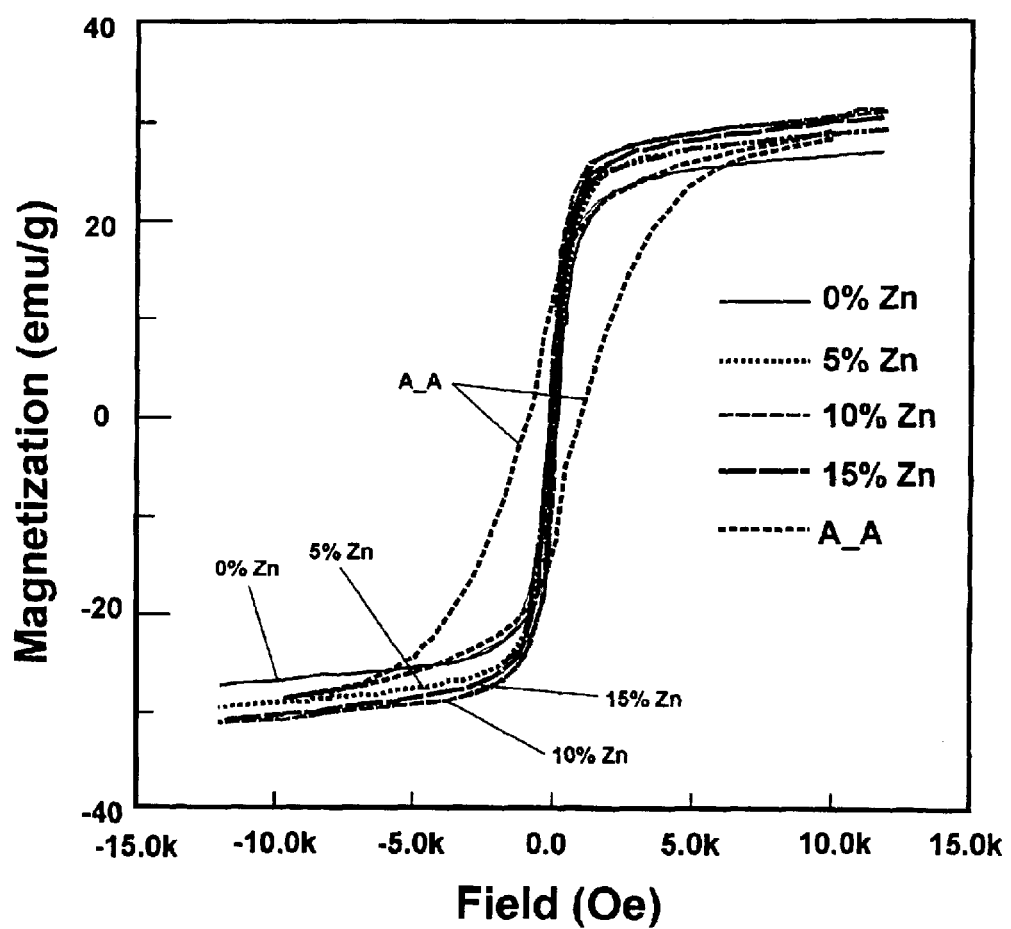
FIG. 19 shows M-H curves of Co-2Y containing 0, 5, 10 and 15% Zn.

The addition of Zn to hexagonal ferrites decreases their Curie temperatures. As shown in Table 2, when Co-2Y was doped with 5, 10, and 15% Zn, each of the Zn additions lowered the Curie temperature of Co-2Y. The addition of 15% Zn to Co-2Y decreased $T_c$ from 340° C. to approximately 300° C. The x-ray diffraction patterns of the Zn-doped materials show that even with the addition of 15% Zn, the hexagonal structure of Co-2Y is retained. The magnetization characteristics of Zn-doped Co-2Y are shown in FIG. 18 and FIG. 19. Each of the Zn additions lowered the Curie temperature of Co-2Y (FIG. 18; Table 2). At 15% Zn, $T_c$ decreased from 340° C. to 300° C. From FIG. 19, it appears that the zinc additions did not significantly affect the hysteresis behavior.

TABLE 2

Effect of zinc content on the magnetization saturation ($M_s$) coercivity ($H_c$) and Curie temperature ($T_c$) of Co-2Y

| % Zn | $M_s$ (emu/g) | $H_c$ (Oe) | $T_c$ (° C.) |
|---|---|---|---|
| 0 | 24.3 | 133.5 | 334.6 |
| 5 | 26.4 | 109.1 | 321.8 |
| 10 | 27.9 | 93.9 | 306.9 |
| 15 | 26.8 | 98.4 | 296.1 |

Figure 20:
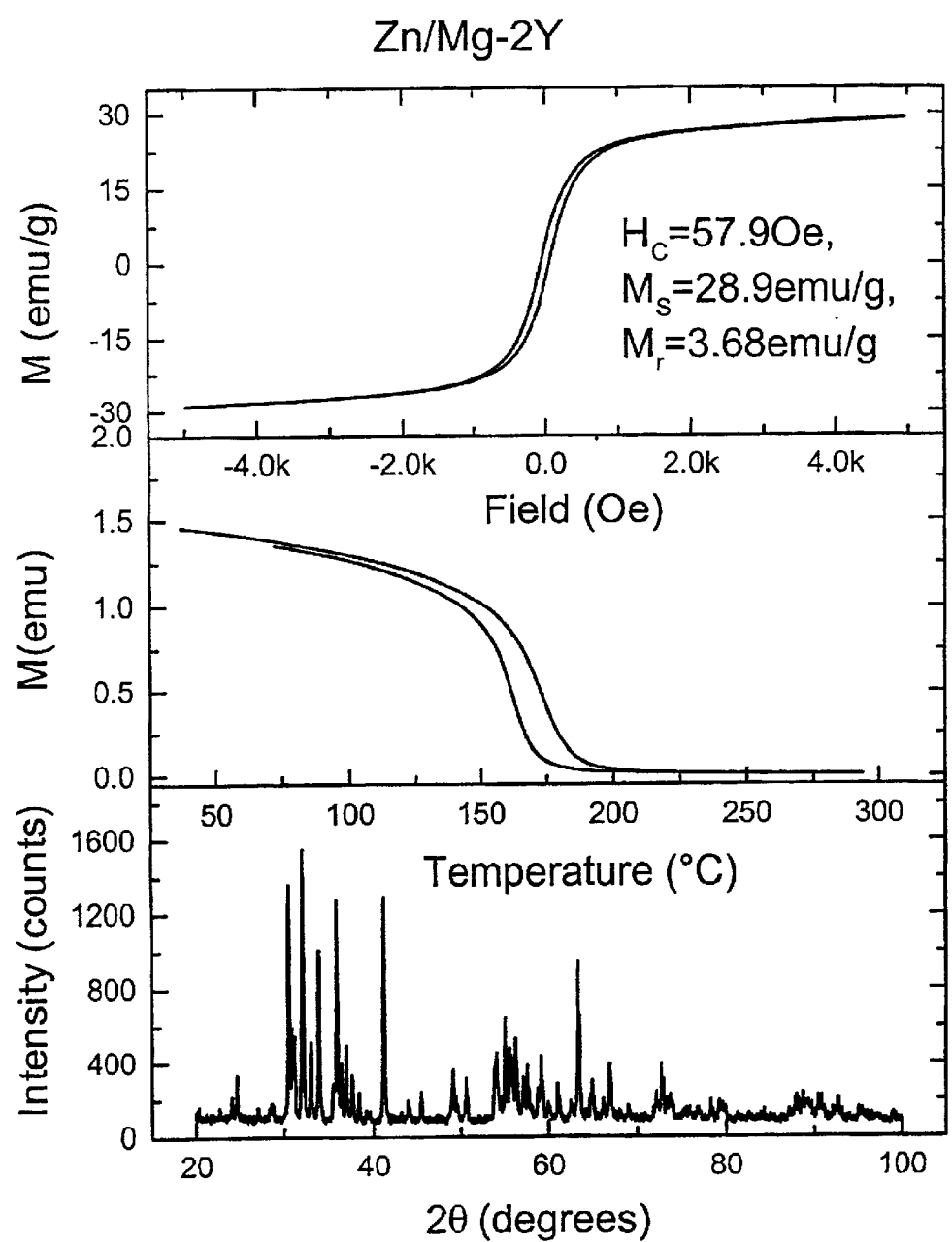
FIG. 20 shows magnetization curves and x-ray diffraction pattern for Zn/Mg-2Y.

The addition of Zn to Mg-2Y also reduces its Curie temperature. When Mg-2Y was synthesized with zinc atoms substituting for half the magnesium (Formula: $Mg_1Zn_1Ba_2Fe_{12}O_{22}$), the Zn/Mg-2Y ferrite exhibits a Curie temperature of 175° C. The addition of zinc to Mg-2Y reduces its Curie temperature from 260 to 175° C. The x-ray diffraction pattern and magnetization curves of Zn/Mg-2Y are shown in FIG. 20. The material is single phase and exhibits a magnetization saturation of 29 emu/g.

Other susceptors may also be utilized in the formation of a "smart susceptor". Other preferred susceptors comprise magnetically soft ferrite particles having the structure $1MeO:1Fe_2O_3$, where MeO is a transition metal oxide. Examples of Me include Ni, Co, Mn, and Zn. Preferred particles include, but are not limited to: $(Mn,ZnO)Fe_2O_3$ and $(Ni,ZnO)Fe_2O_3$, also referred to as MnZn and NiZn ferrites, respectively. Even though "soft" ferrites have a narrower hysteresis loop than the "hard" ferrites, efficient heating with "soft" ferrites is achievable under proper processing conditions, e.g., power level and frequency, that utilize the total hysteresis loop area.

Different ferromagnetic compounds have different hysteretic properties. Comparisons of the hysteresis loops for examples of particular susceptors, i.e., $SrFe_{12}O_{19}$#1 (Triton B) and $SrFe_{12}O_{19}$#2 (Triton C) and $Co_2Ba_2Fe_{12}O_{22}$ powders, are shown in FIGS. 2A and 2B. $SrFe_{12}O_{19}$#1 and $SrFe_{12}O_{19}$#2 are magnetically hard ferrites, having wider hysteresis loops than Co-2Y.

Thus, as aforesaid, in certain applications, preferred susceptors include hexagonal ferrites with low Curie temperatures. Magnetically hard ferrite susceptors with Curie temperatures lower than that of SrF (e.g. $SrFe_{12}O_{19}$, $T_c=450°$ C.) are preferred for a wide range of thermoplastic and thermoset matrix composite systems, both armor- and commercially-related. Examples of preferred hexagonal ferrites that have Curie temperatures lower than $SrFe_{12}O_{19}$ include $Mg_2Ba_2Fe_{12}O_{22}$ (Mg-2Y) and $Co_2Ba_2Fe_{12}O_{22}$ (Co-2Y). Mg-2Y and Co-2Y exhibit Curie temperatures of 280° C. and 340° C., respectively.

FIG. 3 summarizes the results of the tests that have been performed on powders which were done with 275 KHz and 4 MHz induction generators. One phenomenon demonstrated is that frequencies in the order of 3–10 MHz expose the micron-sized particles to many oscillations per second, thus rapidly developing the volume of heat required for reaching fusion temperature.

FIGS. 4A and 4B show the time/temperature curves for $SrFe_{12}O_{19}$#1 (Triton B), $SrFe_{12}O_{19}$#2 (Triton C), $Fe_3O_4$ (<44 micron), $Fe_3O_4$ (<840 micron), $Fe_2O_3$ and $Co_2Ba_2Fe_{12}O_{22}$ powders heated at 275 kHz. Though these particles did not reach their Curie temperature at 275 kHz, the curves show that a variety of heating rates are available by selecting different ferromagnetic powders.

The particles used in the present invention can be of any size. In certain embodiments it is preferred that the particles are from about 1 micron to about 840 microns. In other embodiments, it is preferred that the particles are less than 1 micron. Similarly, the particles are present at from about 1% to about 50% by volume, more preferably from about 10% to about 30% by volume, and most preferably from about 15% to about 20% by volume.

Matrices

The matrix material useful for the practice of the present invention preferably comprises any thermoplastic known in the art. In preferred embodiments, the thermoplastic comprises PEEK, PEKK, PEI, PPS, PSU, PET, polyester, PA, PP, PP/MXD6, PP/EVOH, PE, PU, PPO, PC or combinations thereof.

FIG. 5 summarizes test results that have been performed on polysulfone films filled with various ferromagnetic powders. The data illustrates i) the varying response of the base polymer matrix to varying induction frequencies; ii) the effect of volume percent particles in the film; and iii) the effect of film thickness.

FIG. 6 is a table of several susceptor/polymer matrices. Each of the preferable susceptors has a specific Curie temperature range that is listed in FIG. 6. Each of these susceptors may be prepared using particles that are between 1 to 840 microns in size, or particles that are smaller than 1 micron in size.

FIG. 6 also identifies several preferable polymers that may be used to create a susceptor/polymer matrix. The preferable polymers include, but are not limited to, PEEK, PEKK, PEI, PPS, PSU, PET, polyester, PA, PP, PP/MXD6, PP/EVOH, PE, PU, PPO or PC. Note that the "working temperature" (column 2 of FIG. 6) is approximately 30° C. above the melting temperature of the polymer (column 1). The "Curie temperatures" of the Zn/Mg and Zn/Co blends (columns 6 and 7 of FIG. 6) vary by the concentration of zinc in the susceptor. The "Curie temperature" of the soft ferrites (column 8 of FIG. 6) varies with the choice of ferrite.

Examples of other susceptor/polymer systems include, but are not limited to PEEK/SrF, PEI/Co-2Y, PEI/SrF, PPS/Co-2Y, PPS/Mg-2Y, PSU/Mg-2Y and PP/(Zn,Mg)-2Y. In addition, the polymers can be combined with Zn/SrF, Zn/Co-2Y, Zn/Mg-2Y and mixtures of the hexagonal ferrites, and other combinations described herein and determined by one of ordinary skill in the art.

The particles may be on a surface of the matrix, or alternatively, embedded in the matrix, depending on the desired use. For example, if two surfaces of particular articles are being bonded or welded together, then it may be desirable to have the susceptor particles embedded on only the surface of the article that is to be bonded. The susceptor may also be dispersed in a carrier matrix and applied to the surface of one or both thermoplastic articles to be welded or sealed. Application of this susceptor/carrier composition could be in the form of a tape, spray, liquid or paste. Upon application of the magnetic field, when the susceptors heat up, the carrier may be melted or evaporated away. Alternatively, if the entire article is to be heated according to the present methods, it would be desirable to disperse the susceptors throughout the matrix of the article. One of ordinary skill in the art can readily determine where the susceptors should be placed in order to maximize the efficiency and efficacy of the controlled temperature heating of the susceptors.

The thermoplastics containing the susceptors as described herein, can be shaped or molded by methods known in the art., e.g., by extrusion, compression molding or film casting.

Pre-treatment

The present invention further relates to a pretreatment process that conditions the "smart" susceptor to produce extremely rapid heating rates. The conditioning treatment comprises inductively heating the "smart" susceptor to the Curie temperature prior to exposure to the ultimate bonding or heating application. The combined magnetic field and thermal energy generated by the pretreatment aligns most of the magnetic domains in the susceptors parallel to the applied field. That is, the conditioning treatment introduces a preferred orientation of the magnetic domains. This preferred orientation provides extremely rapid heating rates if a user then uses a magnetic field with the same orientation as used in the conditioning treatment. FIG. 7 shows a diagram of pretreatment and process variables for temperature-controlled induction heating of polymeric materials.

Experimental Temperature time curves for 20v/o Co-2Y in polysulfone (20Co-2Y/PSU), 20v/o Mg-2Y in Nylon-6 (20Mg-2Y/N6) and 15v/o $Zn_1Mg_1$-2Y in Nylon-6 (ZnMg-2Y/N6) show heating rates of 28° C./sec, 18° C./sec, and 20° C./sec, respectively. Co-2Y, Mg-2Y and ZnMg-2Y in the virgin state (i.e., in the untreated condition) heat up much more rapidly than does strontium ferrite in the virgin state. Interestingly, Co-2Y in the virgin state heats up as rapidly as the preconditioned, magnetically harder strontium ferrite.

Figure 16:
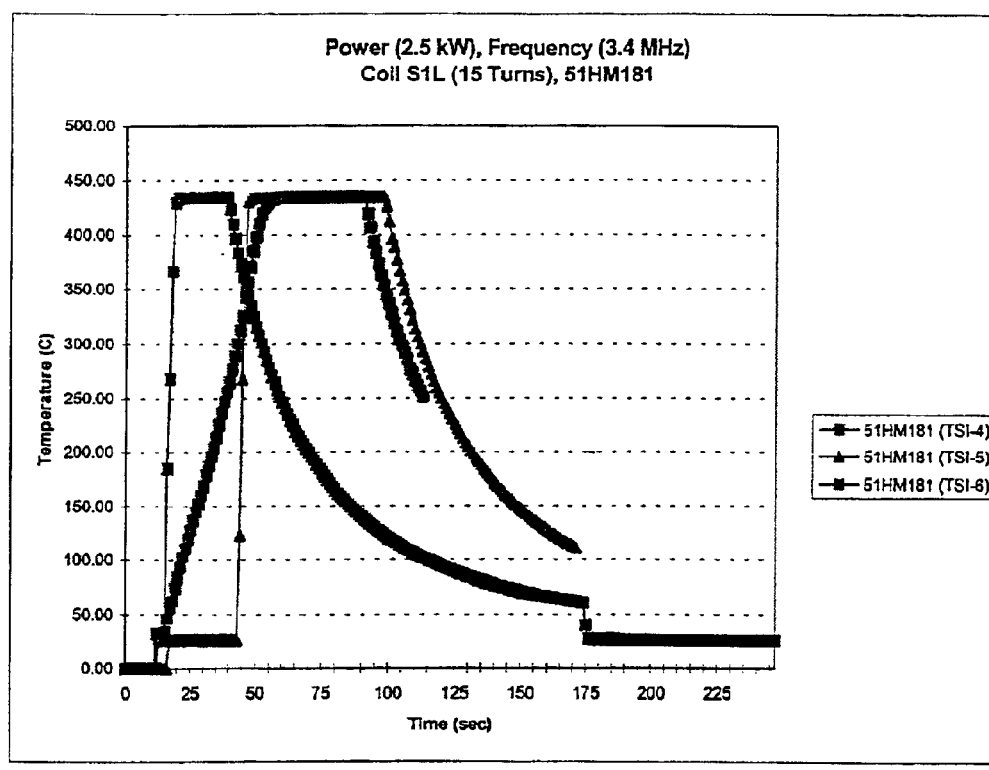
FIG. 16 shows the effect of reheating the 51% SrF/PSU composite.
Figure 17:
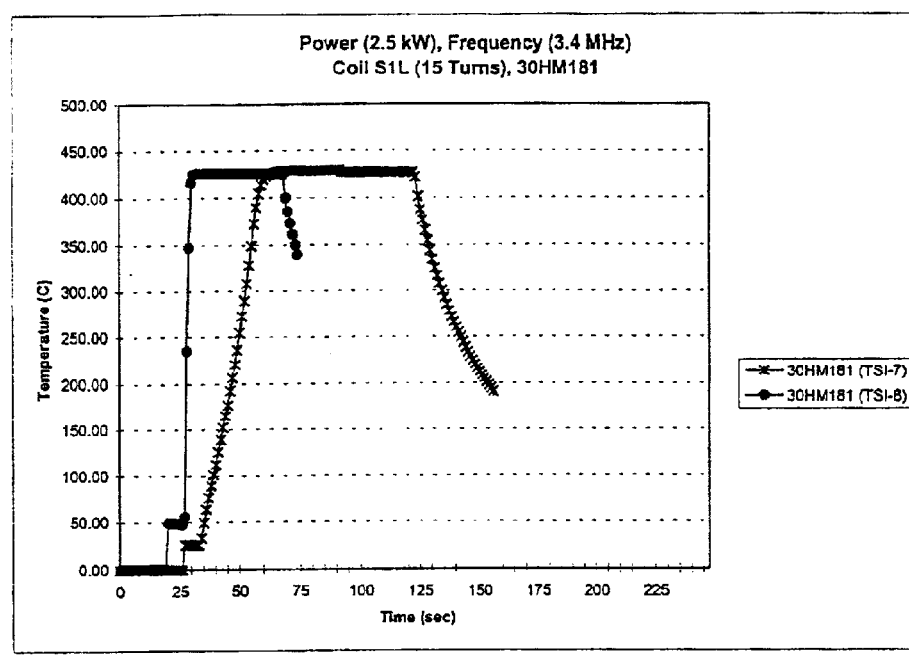
FIG. 17 shows the effect of reheating the 30% SrF/PSU composite.

In other tests, 30 and 51% SrF (also referred to as "HM181SrF") composites were subjected to multiple heating cycles. The test samples had cooled down close to ambient temperature before being reheated a second and third time. With the response time of the optical pyrometer used, on the second and third heating, the samples reached maximum temperature almost instantaneously (FIGS. 16 and 17).

While the inventors do not intend to be bound by theory, one explanation for the rapid heating phenomenon seen with this pretreatment is that on its initial heating to $T_c$, only a fraction of the magnetic domains in the susceptor, e.g., magnetically hard SrF, align themselves with the alternating magnetic field and contribute to heating of the sample. Upon reaching the magnetic transformation temperature ($T_c$), there now is greater "fluidity" and sufficient thermal energy to permit most of the remaining, unaligned domains to align themselves with the applied magnetic field. With most of the magnetic domains in the susceptor now aligned parallel to the applied magnetic field, reheating occurs much more rapidly since many more domains are now participating. If upon reheating, the orientation of the magnetic field is changed from what was before then the rapid heating phenomenon will not be observed because a smaller number of domains will now be participating. The susceptors behave as if they were being heated for the first time. The domains in the magnetically softer ferrites (e.g., Co-2Y, Mg-2Y and ZnMg-2Y) are more easily aligned with the magnetic field during the initial heating than are the domains in the magnetically harder strontium ferrite. Thus, the softer ferrites have most of their domains contributing to the heating process during the initial heating cycle and higher rates of heating are observed.

For the compositions listed in FIG. 6, an alternating induction field of from about 200 kHz to about 30 kHz, preferably from about 500 KHz to about 15 MHz is used. The precise frequency employed can be "tuned", or selected, by one of ordinary skill in the art to minimize the energy requirements and time of heating required. Alternatively, a parallel, uniform magnetic field (PUMF) may be used. Using a PUMF permits a user to take advantage of extremely rapid heating rate capability of a conditioned "smart" susceptor, by aligning the field with the preferred orientation of the particle's magnetic domains induced through the conditioning treatment described above.

This pretreatment step is useful for any matrix which contains a ferromagnetic material that is responsive to a magnetic field and can be used in any of the methods described herein and in other prior art methods to increase the rate of heating thereof. The pretreatment steps are especially useful for methods and compositions that utilize the susceptors and particles described herein.

Induction Coil Design and Magnetic Field Patterns

Depending on the susceptors used and the application, based on the teachings herein, one of ordinary skill in the art can readily determine the frequency and strength of the magnetic field used to induce heating in the present methods and apparatuses. Preferably the useful frequency range is from about 80 KHz to about 30 MHz and the preferred power ranges from about 1.5 KW to about 22 KW. For certain embodiments, e.g., in which the apparatus is used to keep food warm, the ranges are from about 88 KHz to about 310 KHz and a power from about 1500 W to about 2300 W. For other embodiments, where the desired temperature is higher, e.g., bonding, welding or sealing applications, the frequency and power will be at the higher end of the range, e.g., from about 2 MHz to about 15 MHz, preferably from about 3 to about 5 MHz. One of ordinary skill in the art can select the appropriate power and frequency depending on the susceptor and thermoplastic selected and for the desired application, i.e., heating or bonding/welding/sealing.

Depending on the susceptors used, the field generated by the induction coil influences the heating patterns of the susceptors and the field is a function of the coil geometry. Examples of coil design include solenoid, pancake, conical and Helmholtz. While these coil types are among those commonly used by industry, certain embodiments of invention may require specialized coils. For example, in certain embodiments solenoid coils are preferred because solenoid coil geometry produces a very strong magnetic field. In other embodiments, pancake coils are used. Pancake coils have been found to produce a non-uniform field with its maximum at the center. One of ordinary skill in the art can readily select the type of coil based on the teachings in the art and set forth herein.

Magnetic field strength increases with increasing number of coil turns, increasing coil current and decreasing coil-work piece separation. The factors can be readily manipulated by one of ordinary skill in the art to select combinations of these factors to obtain the desired magnetic field strength.

Solenoid Coil geometry produces the strongest field of all the possible geometries. Pancake coils are most common in one-sided heating applications. Changing the coil parameters, e.g., spacing between turns or the number of turns can change the field values, but the pattern is generally the same. Magnetic field strength increases if the coil-part separation is reduced. If the part is placed very close to the coil, one may see the heating dictated by each turn of the coil.

Applications

The potential applications for the methods and compositions of the present invention are innumerable, spanning both military and commercial markets. Examples of military uses include fabrication and repair of aircraft structures, as well as fabrication and repair of shipboard structures. Additionally, the present invention is not limited to fusion bonding of thermoset-based composites, but also could be applied to consolidation and repair of thermoplastic composites or elevated-temperature curing of thermoset adhesives, thereby reducing repair time and increasing performance.

The commercial sector could enjoy similar benefits with respect to the fabrication and repair of composite structures. For example, this technique can be used to repair aging metal structures with composite reinforcements or new bonding techniques developed for commodity resins such as polyethylene.

The compositions and methods of the present invention are useful for any application in which it is desirable to melt the matrix material, e.g., sealing and/or bonding of thermoplastic materials. In such applications, $T_c$ of the particles is greater than the melting temperature of the thermoplastic material. The susceptor particles can readily be selected based upon the teachings described herein.

The compositions and methods of the present invention may be used in the packaging industry, specifically to closure systems. The broad temperature range covered by the susceptors, e.g., those listed in FIG. 6 (175° C. to 450° C.), allows for use in a wide range of commercial applications, e.g., in the food packaging industry where lower temperatures are required. For example, induction heating may be used in the food industry to seal lids without the use of the aluminum peel-away that is commonly used in many packages. The advantages of replacing foil with a direct polymer seal include lower cost, improved recyclability and the ability to control the bonding conditions, including temperature, of complex seal shapes, such as a thin ring on the rim of a beverage container, or a lid on a food tray.

As one example of the sealing method, a cup containing a food product may be sealed with a lid by inductively heating ferrites uniformly distributed throughout or concentrated in a rim of the cup or in an annular area of the lid or both. Inductively heating the ferrites at the annular seal area while pressing the cup rim and lid together, for example with an induction heating horn, fuses and co-cures the plastic material of the cup and lid. This method can be used for any sealing application, e.g., sealing boxes or containers enclosing any type of materials. Examples of such materials include prepared foods, foodstuffs, ingredients, liquids as well as non-edible products and liquids. For example, the sealing technology can be used to seal cartridges and filters of different types, e.g., water filters, oil filters, medical devices. One of ordinary skill in the art can readily apply the methods of the present invention to any application that requires sealing or bonding of thermoplastics.

Another example of a preferable use is in manufacturing aviation, auto and marine structural components: specifically, fabricated structures that comprise one polymer component welded to another polymer component. The susceptors and methods of using the susceptors described herein can be applied to either one or both of the components and inductively heated to weld or seal the components together. Another use is in the repair of structures that comprise one polymer component welded to another polymer component.

Figure 8:
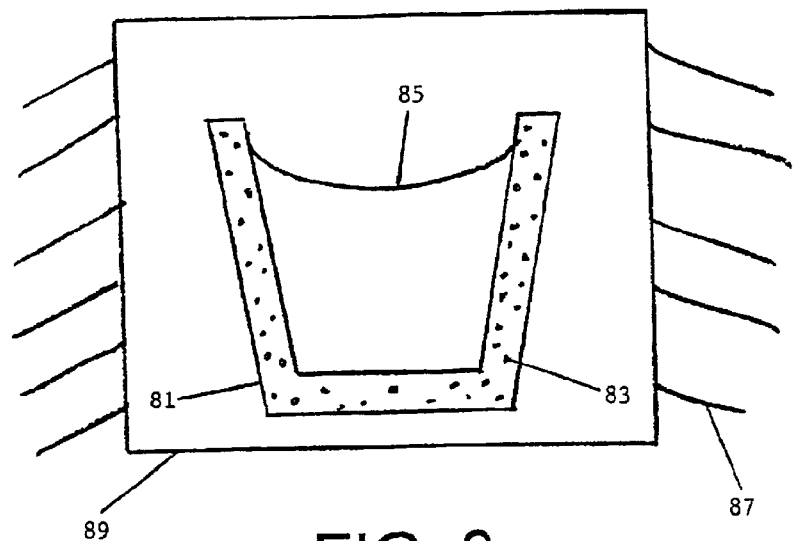
FIG. 8 is a front view of a cup having susceptors disposed within for heating a liquid.
Figure 9:
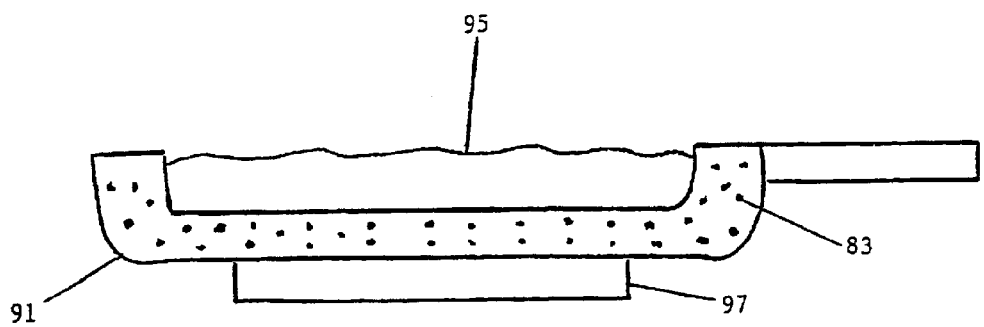
FIG. 9 is a side view of cookware having susceptors disposed within for heating materials.
Figure 10:
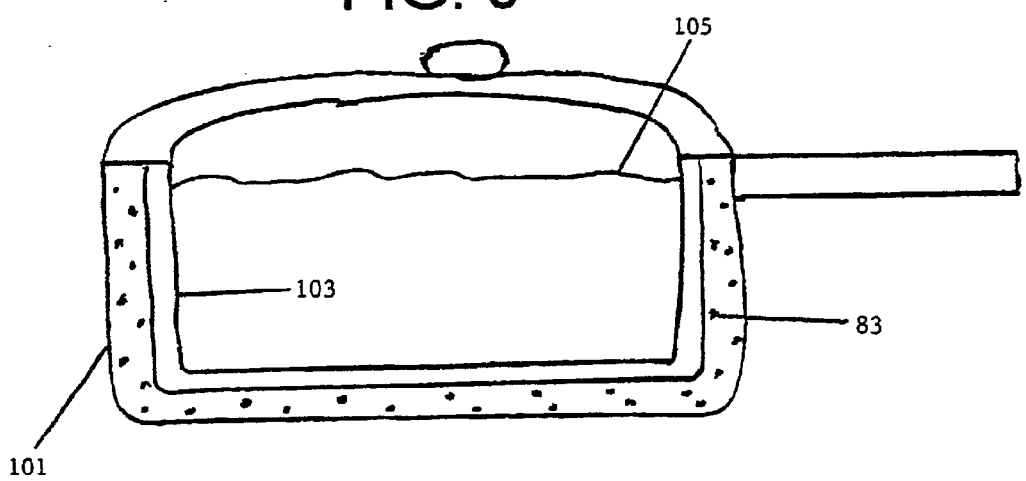
FIG. 10 is a side view of cookware having susceptors disposed within and a laminated layer for heating materials.

In other applications, the $T_c$ of the particles is less than the melting temperature of the matrix material. These compositions are useful when it is desirable to heat the matrix close to the $T_c$ without melting the matrix, e.g., a heating apparatus. Examples of heating apparatuses are shown in FIGS. 8, 9 and 10. The heating apparatus is useful for heating different types of materials. A vessel 81, 91 and 101 having a shaped matrix contains the materials 85, 95 and 105 to be heated. Susceptors, i.e., magnetic particles 83, having specific Curie temperatures are disposed in the matrix for heating the vessel with the susceptors to a predetermined Curie temperature upon application of a shifting magnetic field and heating the vessel to heat the materials.

The heating apparatus may have a layer of distinct material laminated 103 to the shaped polymeric material, as shown in FIG. 10. An example of a use of the present invention is for cookware, as shown in FIGS. 8, 9 and 10. In that application, the entire vessel 81, 91 and 101 is made of the polymer composite. In this way, the vessel itself may be heated to a predetermined temperature, thereby controlling the temperature of the vessel.

The materials 105 disposed in the vessel may be comestible. The vessel may be cookware, and the materials are food within the cookware, as shown in FIG. 9 and 10. The vessel may also be tableware, and the materials are food within the tableware. The vessel may be a cup 83, and the materials 85 are a liquid within the cup, as shown in FIG. 8. The vessel 81 may be heated by placing the vessel in an apparatus 89 that generates an alternating field 87. The vessel 91 may be heated by an electric coil 97, as shown in FIG. 9.

In certain embodiments in which very high temperatures are not desired, e.g., for keeping food warm, it may be preferable to use soft ferrites, having the appropriate low $T_c$, as the susceptors used in the vessel.

The present invention provides a method of controlled temperature bonding of a polymeric material. The material is flowed and then heated. Magnetic particles are then disposed in the heated polymeric material. The magnetic particles may be any of the ferromagnetic hexagonal ferrite particles described herein, such as the following (although this list is nonexclusive): Mg-2Y, Co-2Y, Zn/Co-2Y, Zn/Mg-2Y and magnetically soft ferrite particles. The polymeric material is then formed. An alternating induction field is applied to the polymeric material, which heats the ferromagnetic particles and heats the polymeric material with hysteresis losses from the ferromagnetic particles. Application of the alternating magnetic field is continued until the ferromagnetic particles reach their Curie temperature, when the heating is ceased. In certain of these embodiments, an alternating induction field at about 2 to about 15 MHz is applied. Varying the amount of zinc in the Zn/Mg-2Y or the Zn/Co-2Y particles controls the Curie temperature of the particles.

The present invention also provides an apparatus made of ferromagnetic particles that are selected from a group of ferromagnetic particles in the following nonexclusive list: ferromagnetic hexagonal ferrites, e.g., Co-2Y, Mg-2Y, Zn/Co-2Y, Zn/Mg-2Y, and magnetically soft ferrite particles. The particles have specific Curie temperatures, and are embedded in a surface of a polymeric material. An inductor heats the polymeric material with the embedded ferromagnetic particles to their Curie temperature. A power source connected to the inductor supplies power to the inductor.

The present invention also provides a susceptor composition for inclusion in a matrix for heating the matrix to a desired Curie temperature. Examples of susceptors comprise the hexagonal ferrites and magnetically soft ferrites as described herein. The Curie temperature may be changed by varying proportions of zinc in the composition. This susceptor is useful in the methods and compositions and apparatuses of the present invention.

The present invention also provide a composite comprising a matrix and a susceptor included in the matrix for heating the matrix to a desired Curie temperature, wherein the susceptor comprises the hexagonal ferrite Zn/Co-2Y. The Curie temperature may be changed by varying proportions of zinc in the composition. This composite may then be used in the methods apparatuses of the present invention.

In yet another embodiment, the methods of induction bonding are used to weld the seams of structures made of thermoplastic materials, for use in the field, e.g., by military forces. One example, as described below is useful for joining polyurethane skin to itself. In one embodiment, filler particles, i.e., the susceptor particles of the present invention, are dispersed into a thermoplastic matrix that heat up in the presence of a magnetic field. These particles are designed to thermally match the softening point of a variety of thermoplastic resins, into which they can be compounded. In one embodiment, polyurethane gaskets were used to weld Seaman Corp. polyurethane-coated Nylon fabric.

In the presence of a magnetic field, the susceptor particles heat very rapidly to a predetermined temperature, the Curie temperature. As aforesaid, once the Curie temperature of the particles is reached, the particle's magnetic properties change, causing the material to stop heating. This built-in thermostatic control offers a powerful means of avoiding overheating with very precise temperature control during manufacturing. Moreover, the heating mechanism is fully reversible, lending itself to post manufacturing repair of any defects.

The present invention is further illustrated by the following Examples. The Examples are provided to aid in the understanding of the invention and are not construed as a limitation thereof.

EXAMPLES

Example 1

Extrusion Compounding/Compression Molding

The following compounds were successfully extruded and compression molded into sheets for evaluation in induction heating experiments:

10, 12, and 15v/o. SrF in PSU 15 and 30v/o SrF in PEEK

15v/o SrF in PEI

20v/o Co-2Y in PSU

20v/o Mg-2Y in Nylon-6

15v/o $Zn_1/Mg_1$-2Y in Nylon-6

SrF was obtained from Steward Ferrite (Chattanooga, Tenn.), under the tradename HM 181.

Example 2

Induction Heating Procedures

All induction heating trials were done using a Lepel model T-7.5-3-DF-SW induction generator with a solenoid coil. The coil (No. S 1L) was a 1" ID, 15 turn design constructed from ⅛" tubing that had total length of ~2.4". With this coil, and a representative sample in the coil, the generator operated at a frequency of 3.2 MHz and an estimated power of 2.3 KW. All heating trial samples consisted of a 1" square of compound, approximately 20 mils thick that was taped to a glass slide. In order to prevent the slide from cracking due to thermal shock, a 1" square of 1/16" thick ceramic insulation was placed under all samples. All data was collected using a Raytek IR pyrometer that was set up to sight between 2 turns on the coil at the sample. The Raytek pyrometer was roughly calibrated by heating 51 and 30 Vol. % SrF/PSU samples painted with a strip of temper paint. The known melt temperature of the temper paint (800° F.) was correlated with the reading from the Raytek system. The emisivity was adjusted until the observed temperature of the IR pyrometer matched the known melt temperature of the temper paint. The system was not recalibrated for the various compositions, nor was the calibration checked throughout the course of the experiments. The observed $T_{max}$ values are therefore only estimates of the actual values to within an estimated accuracy of +/−15° C.

Induction Heating Results

A summary of induction heating trials on a range of compounded materials is presented in Table 3. The results show the rapid heating of SrF following an initial induction heating to $T_c$. This phenomenon was viewed in a full range of compositions ranging from 10–51 Vol. % SrF in PSU as well as 15 Vol. % SrF in PEI and PEEK. Additionally, heating trials on pure SrF powder showed evidence of the rapid reheating phenomenon. This would suggest that exposure of the strontium ferrite to the induction generators high frequency energy has an effect on the high frequency magnetic properties of the SrF.

TABLE 3

Induction Heating Test Summary

| Susceptor | Matrix | Vol. % | $T_{max}$* | Rapid Reheat |
|---|---|---|---|---|
| SrF | PSU | 10 | 428 | Yes |
| SrF | PSU | 12 | 432 | Yes |
| SrF | PSU | 15 | 433 | Yes |
| SrF | PSU | 21 | 444 | Yes |
| SrF | PSU | 30 | 455 | Yes |
| SrF | PSU | 51 | 458 | Yes |
| SrF | PEEK | 15 | 448 | Yes |
| SrF | PEEK | 30 | 427 | No (Initial Fast) |
| SrF | PEI | 15 | 419 | Yes |
| SrF | None | 100 | 422 | Yes |
| Co-2Y | PSU | 20 | 334 | No (Initial Fast) |
| Mg-2Y | Nylon | 20 | Na | NA |
| Zn/Mg-2y | Nylon | 15 | 202 | No (Initial Fast) |

*Value from second heating, Emisivity was not adjusted to compensate for different materials.

Example 3

Heating experiments were conducted with a Heuttinger induction generator that produces approximately 20 KW of output power at 2.3 MHz. The Lepel generator used in earlier heating experiments produced an estimated power output of only 2.3 to 5.8 Kw. With the Heuttinger generator, and employing pancake coils with 3 to 5 turns, the Curie temperature of 450° C. was reached in 15 to 30 seconds. The rapid heating phenomenon was confirmed with the Heuttinger generator for both bonded and non-bonded SrF.

Heating a virgin sample of 51 SrF/ PSU to its Curie temperature without the application of a magnetic field (i.e., subjecting the sample to thermal energy only) does not produce rapid heating rates when heated a second time by induction.

Heating the susceptor inductively to temperatures below its Curie temperature also does not produce rapid heating rates when heated a second time by induction. To produce the rapid heating phenomenon, the susceptor must be preconditioned by inductively heating it to its Curie temperature.

Results further suggest that a preconditioned susceptor exhibits rapid heating rates only if its orientation relative to the applied magnetic field remains the same, or reasonably close to the same, during subsequent heating cycles.

In the virgin condition, Co-2Y, Mg-2Y and Zn/Mg-2Y, heat up much more rapidly than does the magnetically harder strontium ferrite.

Example 4

Rapid Heating Phenomenon

Induction Heating to $T_c$

A virgin sample of 51SrF/PSU (composed of 51v/o strontium ferrite in polysulfone) was preconditioned by inductively heating it to its $T_c$. The sample was placed on top of a 3-turn pancake coil (P1) which had an overall diameter of about 3.5-in, and spacing between turns of approximately ½-in. The heating rate to $T_c$ during the preconditioning treatment was 6° C./sec. Upon reheating the preconditioned sample (after first allowing it to cool to room temperature), the heating rate increased to 34° C./sec. This experiment was repeated a number of times with the same result.

The use of a preconditioning treatment on non-bonded SrF powder also produced a higher heating rate on reheating (FIG. 11). However, the increase in heating rate was only 20%. In previous experiments with the Lepel unit and a 15-turn solenoid coil, we observed an increase in the rate of heating for SrF powder of 135%.

Oven Heating to $T_c$

A virgin sample of 51SrF/PSU was heated in an oven to its Curie temperature (450° C.) and held at temperature for 1.0 minute. It was then heated by induction to its Curie temperature. Its rate of heating during the induction heating cycle was only 4° C./ sec. Heating the sample for a second time by induction resulted in a heating rate of 29° C./sec. It is clear that heating a virgin sample to its Curie temperature without the application of a magnetic field (i.e., subjecting the sample to thermal energy only) does not produce the rapid heating phenomenon. The application of a magnetic field during heating is essential to produce the rapid heating effect.

Incremental Heating

51SrF/PSU ($T_c$=450° C.) was heated sequentially by induction to 210° C., 280° C., 318 ° C., 450° C. and finally, a second time, to 450° C. After each incremental heating cycle the sample was cooled back to room temperature before being reheated to the next higher temperature. The heating rate increased significantly to 36° C./ sec when the sample was reheated following its first heating at 450° C., its Curie temperature. The results show the sample preconditioned by being heated to its Curie temperature under an applied magnetic field. Inductively heating the susceptor to temperatures below its Curie point will not produce subsequent rapid heating rates.

Orientation

SrF/PSU was laid on top of pancake coil P1 (i.e., the sample was oriented parallel to the coil) and inductively heated to 450° C. Its rate of heating to the Curie temperature was 4° C./ sec. We then reoriented the sample +45° to the coil. Upon heating the sample a second time, we would expect it to heat up much more rapidly. However, when the sample was reheated with its new orientation relative to the magnetic field, the rate of heating remained the same (4° C./sec) as in the first heating cycle. We then reoriented the sample −45° to the coil and heated it again. The rate of heating remained essentially the same at about 5° C./sec.

Another SrF/PSU sample which had been preconditioned exhibited a heating rate of 34° C./sec when reheated. When this sample was rotated 90° relative to its original position and reheated, its heating rate was reduced to 17° C./sec.

These results suggest that a preconditioned SrF/PSU sample exhibits rapid heating rates when its orientation relative to the applied magnetic field remains the same, or reasonably close to the same, during subsequent heating cycles.

Example 5

Controlled Temperature Systems Development for Thermal Energy Storage Applications The heating technology of the present invention was used to raise the temperature of a thermoplastic thermal storage plate using a magnetic field which couples with the ferromagnetic susceptors of the present invention. This effort has successfully shown that the plate temperature can be accurately controlled and that the temperature remains constant over a 15 minute time period. The frequency, power level and coil design all affect the performance of the system.

Results

A matrix resin and susceptor were selected and the two materials were compounded into 10"×10" plaques. These were tested using a power generator to heat the material and monitor temperature. The details of these tasks are presented below.

Resin Selection

Valox 312 PBT (polybutylene terephthalate) from GE was selected as the matrix resin. An injection moldable grade was selected. Three different susceptors were selected for trials. Two of the susceptors were identical in composition and Curie temperature; however the average particle size was significantly larger in one of them. The susceptor identification is shown below in Table 4.

TABLE 4

| Identification | Curie temperature | Average particle size |
| --- | --- | --- |
| NiZn ferrite (Susceptor 1) | 115° C. | 15 microns |
| NiZn ferrite (Susceptor 2) | 80° C. | 80 microns |
| NiZn ferrite (Susceptor 2A) | 100° C. | 15 microns |

The PBT resin was compounded with each of the three susceptors at 12% and 20% by volume using a 25 mm twin-screw extruder producing a total of six different material choices to characterize. 4"×4"×¼" plaques of each material were compression molded for heating trials.

A series of heating trials were conducted using an induction power generator. The surface temperature of the plaques were carefully monitored and recorded for analysis. No damage, distortion or odor generation was observed in any of the plaques even when they got to a higher than desired temperature.

As part of this heating trial, 4 different power levels were used, 4 different frequencies were used and 3 different coil designs were used. These parameters were examined in order to determine the most appropriate considerations for a power generator that would be designed and manufactured for this specific application. The results of these trials are shown below in Table 5. Susceptor 1, 2 and 2A are identified in the above table.

We compression molded 10"×10"×¼" plaques from material that showed the best thermal stability and that heated to the specific surface temperature required (220° F.–240° F.).

TABLE 5

Test conditions and results from heating trials

| Run # | Power (Watts) | Freq. | Susceptor | Loading level (Volume %) | Coil design | Max Temp ° F. | Time (min.) |
|---|---|---|---|---|---|---|---|
| 98BOPA1 | 1500 | 310 kHz | 1 | 12 | Oval pancake | 267 | 5 |
| 98COPA1 | 1500 | 310 kHz | 1 | 20 | Oval pancake | 281 | 5 |
| 98FOPA1 | 1500 | 310 kHz | 2A | 12 | Oval pancake | 244 | 5 |
| 98GOPA1 | 1500 | 310 kHz | 2A | 20% | Oval pancake | 244 | 5 |
| 98BSA | 2100 | 88 kHz | 1 | 12 | Solenoid | 230 | 15 |
| 98CSA | 2100 | 88 kHz | 1 | 20 | Solenoid | 238 | 15 |
| 98DSA | 2100 | 88 kHz | 2 | 12 | Solenoid | 178 | 15 |
| 98ESA | 2100 | 88 kHz | 2 | 20 | Solenoid | 174 | 15 |
| 98FSA | 2100 | 88 kHz | 2A | 12 | Solenoid | 210 | 15 |
| 98GSA | 2100 | 88 kHz | 2A | 20 | Solenoid | 217 | 15 |
| 98BOP | 2300 | 140 kHz | 1 | 12 | Oval pancake | 245 | 15 |
| 98COP | 2300 | 140 kHz | 1 | 20 | Oval pancake | 244 | 15 |
| 98DOP | 2300 | 140 kHz | 2 | 12 | Oval pancake | 155 | 8 |
| 98EOP | 2300 | 140 kHz | 2 | 20 | Oval pancake | 180 | 8 |
| 98FOP | 2300 | 140 kHz | 2A | 12 | Oval pancake | 217 | 8 |
| 98GOP | 2300 | 140 kHz | 2A | 20 | Oval pancake | 182 | 8 |
| 98BCP | 5250 | 80 kHz | 1 | 12 | Circular pancake | 278 | 8 |
| 98CCP | 5250 | 80 kHz | 1 | 20 | Circular pancake | 288 | 8 |
| 98DCP | 5250 | 80 kHz | 2 | 12 | Circular pancake | 155 | 8 |
| 98ECP | 5250 | 80 kHz | 2 | 20 | Circular pancake | 173 | 8 |
| 98FCP | 5250 | 80 kHz | 2A | 12 | Circular pancake | 259 | 8 |
| 98GCP | 5250 | 80 kHz | 2A | 20 | Circular pancake | 274 | 8 |

The molded plaques can be heated to a predetermined temperature. These plaques heat within 3 minutes, and the plaques maintain a stable surface temperature while in the field. Two susceptors were shown to be very effective and several power levels and frequencies were all capable of heating the plaques. Finally, the process to combine the susceptors with the resin material was done without any modifications to the processing equipment.

Figure 12:
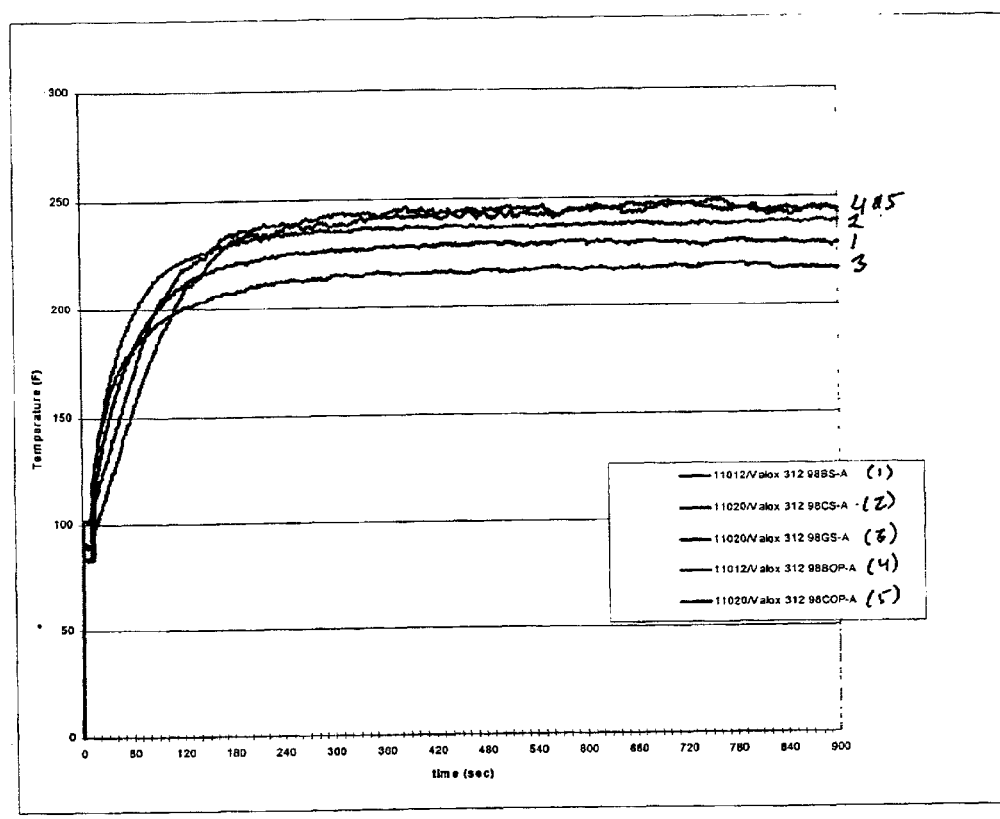
FIG. 12 is a temperature profile of results.

The results show that all three susceptors provided heat up of the molded plaques. Susceptors 1 and 2A brought the temperatures up to the 220° F. See FIG. 12. All of the tested plaques got to temperature within three minutes. Plaques that were run out to 15 minutes maintained excellent thermal temperature profile with no signs of temperature increase. Surface temperature variance was no greater than ±5° F. Depending on coil design, power level and frequency, the use of 12% by volume of susceptor meets the surface temperature requirement. The surface temperature of 220° F. can be met with a design that uses between 1500W and 2300W with a frequency between 88 kHz and 310 kHz. The PBT resin does not distort, give off an odor or change color in any of the tests that were conducted. This resin processes easily in standard plastics processing equipment.

The results show the use of ferromagnetic susceptors embedded in a thermoplastic matrix to raise the temperature of a molded part.

Example 6

The following sections show data generated as a function of power level (from 2–6 kW) and frequency (from 3 to 6 MHz). Specifically, in these studies, SrF susceptor was used at volume fractions of 10, 21, 30, and 51% respectively. These specimens were heated at estimated power levels of 2 to 6 kW and frequencies ranging from approximately 3 to 6 MHz. Solenoid, conical and Helmholtz coil designs were used to couple with the workpiece.

Figure 13:
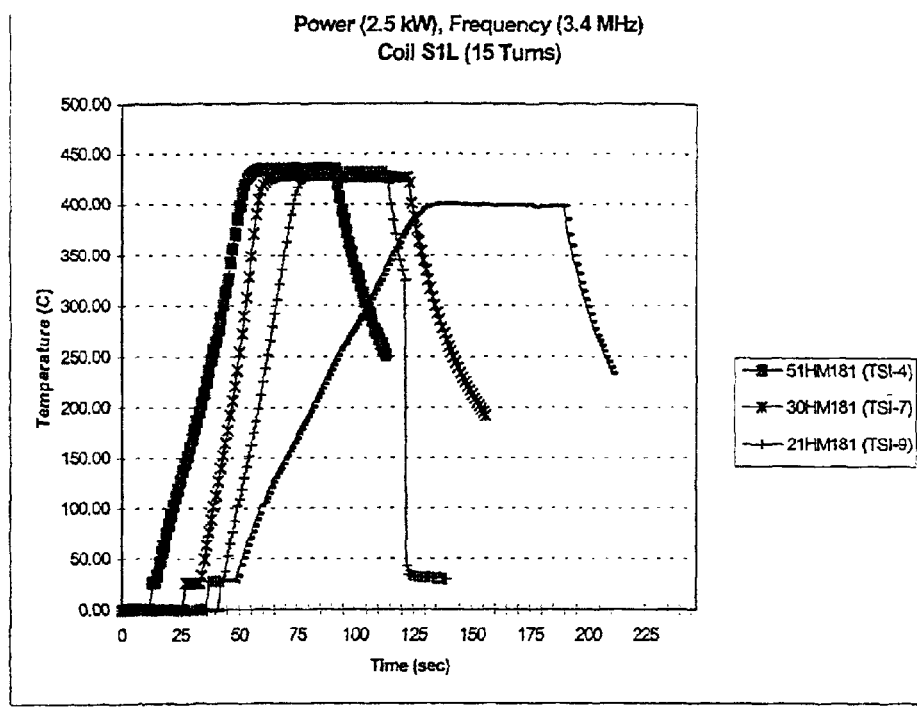
FIG. 13 shows T-t curves for 10, 21, 30, and 51% SrF by volume in Polysulphone (PSU).
Figure 14:
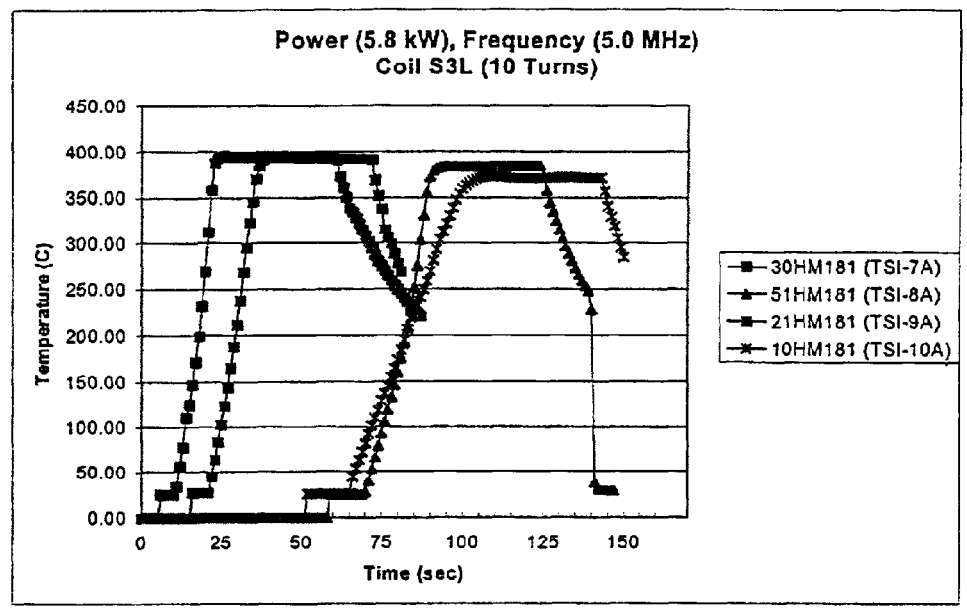
FIG. 14 shows T-t curves for 10, 21, 30, and 51% SrF by volume in PSU.

The T-t curves for the composites heated with a solenoid coil are reproduced in FIGS. 13–14. Curie temperature—controlled induction heating is clearly evident. The curves exhibit an initial rapid rise in temperature followed by a leveling off at a maximum, constant temperature close to the Curie point of SrF. The time to reach maximum temperature for different susceptor concentrations and processing conditions varied. With a 15-turn coil, a frequency of 3.4 MHz and power estimated at 2.5 kW, the 21, 30 and 51% SrF reached the maximum temperature of 430° C. in approximately 45 seconds. Under the same processing conditions, it took about 95 seconds for 10% SrF system to reach a maximum, constant temperature of 400° C. With a 10-turn coil and an increase in power and frequency to 5.8 kW and 5.0 MHz, the time to reach a constant, maximum temperature was reduced to 30–35 seconds for composites containing 21, 30 and 51% SrF. The maximum temperature reached under these conditions was recorded as 390° C. The 10% SrF system required 60 seconds to reach a recorded temperature of 372° C. Table 6 presents the summary of the findings. FIGS. 13–14 illustrate the T-t curves for a number of systems.

For optimum joint strength, it is preferable to use the lowest possible susceptor particle concentration consistent with a high rate of heating, e.g., approximately 21% SrF which provides heating rates essentially equivalent to 51% SrF.

TABLE 6

Time To Reach Maximum Temperature

| Coil Type/Power/ Frequency | v/o SrF | Tmax (° C.) | T (sec) |
|---|---|---|---|
| Coil S1L: 15 Turns | 51 | 435 | 45 |
| Power: 2.5 kW | 30 | 426 | 45 |
| Frequency: 3.4 MHz | 21 | 432 | 46 |
|  | 10 | 399 | 95 |
| Coil S1L: 15 Turns | 30 | 430 | 60 |
| Power: 2.3 kW | 21 | 428 | 75 |
| Frequency: 4.1 MHz | 10 | 399 | 240 |
| Coil S2L: 6 Turns | 51 | 405 | 122 |
| Power: 3.3 kW | 30 | 410 | 91 |
| Frequency: 3.8 MHz | 21 | 409 | 155 |
|  | 10 | 155[1] | 338 |
| Coil S2L: 6Turns | 51 | 410 | 64 |
| Power: 3.6 kW | 30 | 411 | 64 |
| Frequency: 5.7 MHz | 21 | 414 | 65 |
|  | 10 | 385[2] | 365 |
| Coil S3L: 10 Turns | 51 | 384 | 36 |
| Power: 5.8 kW | 30 | 390 | 28 |
| Frequency: 5.0 MHz | 21 | 392 | 25 |
|  | 10 | 372 | 60 |

[1]Unit turned off at 338 sec (5.6 min)
[2]Unit Turned off at 365 sec (6.1 min)

Example 7

Seaming—Tank Panel Joining Technique

Figure 15:
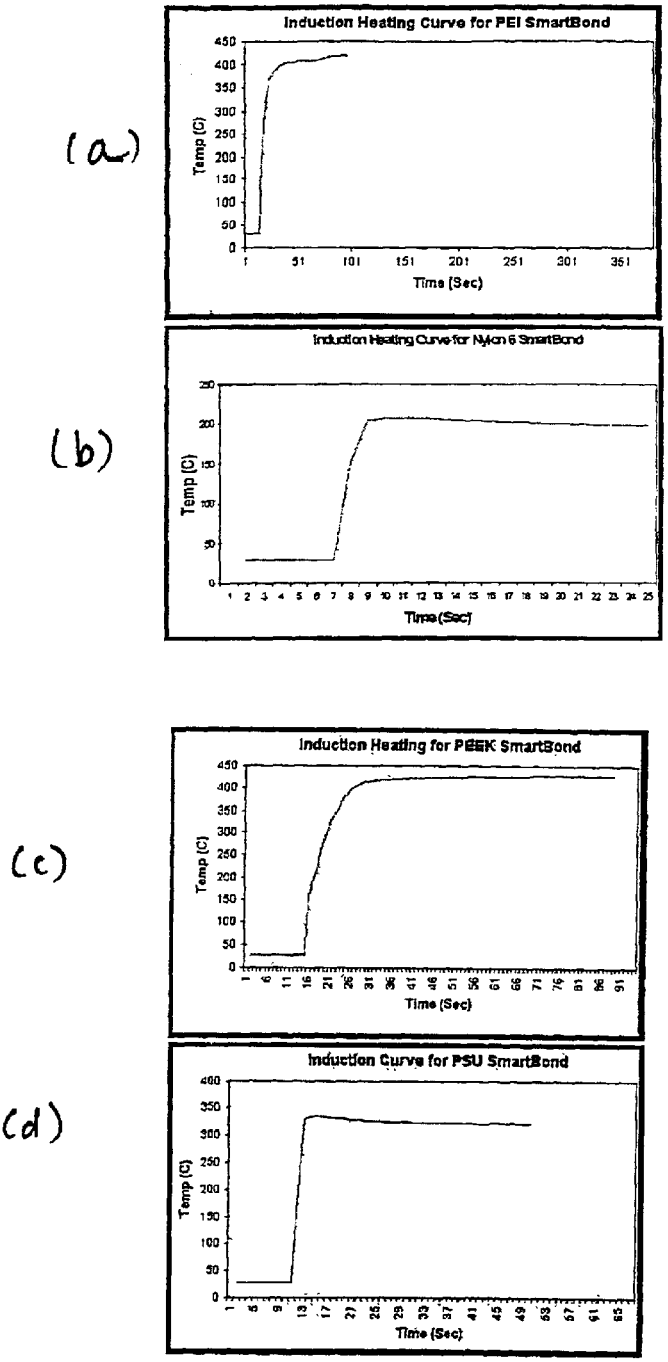
FIG. 15 shows four examples of Adhesive System Response to Induction Current. PEI=poly(etherimide); PEEK=poly(etheretherketone); PSU=poly(sulfone).

By eliminating the problem of "run-away" temperature, the methods of the present invention ensure maximum bond integrity. Susceptors can be designed with specific Curie temperatures, e.g., from about 100° C. up to at least 600° C. The susceptors can then be selected to match the processing temperature of the polymer in which they are dispersed, or the surface to which they are to bond. FIG. 18 shows that the susceptors can be selected based on the particular thermoplastic or resin used. For example, the bonding temperatures for various thermoplastics are as follows: High Density Polyethylene—135° C.; Polyphenylene oxide/Polystyrene—200° C.; Nylon 6—205° C.; Polyurethane—180° C.; Polysulfone—300° C.; Polyetherimide—330° C.; Polyether ether ketone—405° C. The susceptors used in FIG. 15 were as follows: (a) 15SrF/PEI (e.g., 15 vol % strontium ferrite in PEI); (b) 15Zn/Mg-2Y/N6 (e.g., 15 vol % Zn/Mg-2Y in Nylon 6); (c) 15SrF/PEEK (e.g., 15 vol % strontium ferrite in PEEK) and (d) 20Co-2Y/N6 (e.g., 20 vol. % Co-2Y in Nylon 6).

Figure 21:
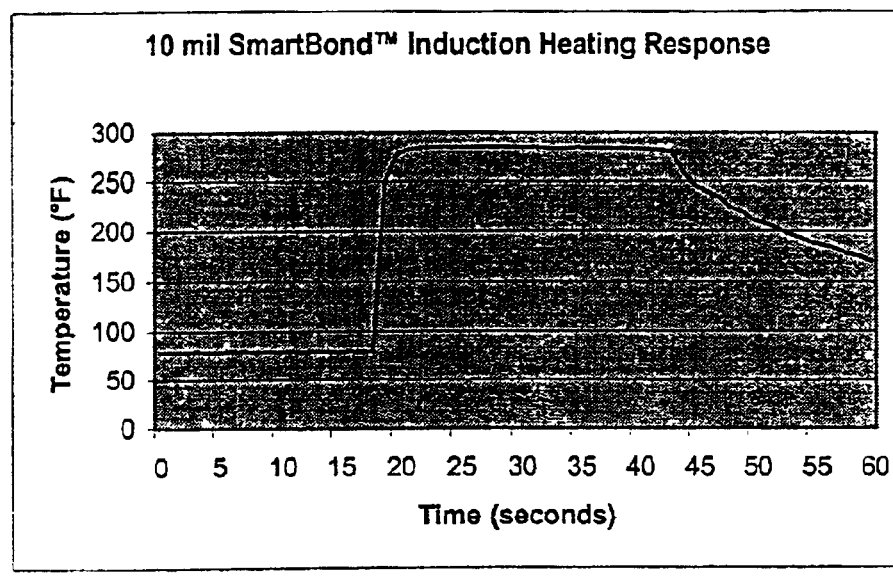
FIG. 21 shows the induction heating response of NiZn ferrite in fuel tank fabric.

A gasket was developed using NiZn soft ferrite to weld the seams of collapsible tanks. A number of samples of actual fuel tank fabric made of polyurethane coated Nylon (Seaman 1932 PTFF) was sent to Lepel Corporation to perform induction bonding experiments. The first set of experiments performed showed the induction heating response of the gasket material produced by Seaman. The gasket was mounted on a glass slide and slid into the induction coil. An infrared temperature sensor was pointed to a spot on the gasket. The sample was then heated by induction and the temperature history of the gasket was recorded. The gasket reached full temperature (approximately 280° F. or 138° C.) in less than 20 seconds. The temperature remained steady at 280° F. until the induction coil was turned off at about 43 seconds. See FIG. 21.

Once it was determined that the gaskets produced by Seaman were performing as expected, we proceeded with producing actual bonded specimens. Three types of samples were produced: single lap; single lap with one layer of tape on one side of the seam; and single lap with one layer of tape on both sides of the seam.

Two gasket thicknesses were tested: 60 mils and 10 mils. Both performed satisfactorily, producing bonds that seem to be as strong as the material itself.

Example 8

A twin screw extruder was used to compound the susceptor into the matrix at the desired level. This piece of equipment has been especially optimized to compound the susceptor particles at various volume fractions. Once compounded, the system offers the flexibility of producing compounded resin in the "rod" form (welder's rod), in "pellets" for subsequent extrusion, or in flat "sheet" form. A sheet die was attached to the end of the extruder forcing the molten extrudate to move through the die lips converting the compounded but molten resin into flat sheets. These sheets were subsequently taken up using rollers and slit into tapes varying in width from ¼ inches all the way up to 6 inches.

Another important feature of this sheet die extruder is that the sheet (or gasket) thickness can be adjusted from approximately 1 mil all the way up to 20 mils or more.

The invention has been described in detail with particular references to the preferred embodiments thereof. However, it will be appreciated that modifications and improvements within the spirit and scope of this invention may be made by those skilled in the art upon considering the present disclosure.

The references cited herein are incorporated by reference.

We claim:

1. A composition for controlling temperature induction heating comprising at least one matrix material and ferromagnetic electrically non-conductive hexagonal ferrite particles, where the ferrite particles are greater than or equal to about 1 micron in size and have a specific Curie temperature ($T_c$) in the matrix material and wherein the specific Curie temperature is substantially similar to a processing temperature of the matrix material.

2. The composition of claim 1, wherein the ferromagnetic hexagonal ferrite particles are selected from the group consisting of $SrFe_{12}O_{19}$, $Me_a$-2W, $Me_a$-2Y, and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation.

3. The composition of claim 2, wherein the divalent cation is selected from Mg, Go, Mn and Zn.

4. The composition of claim 2, wherein the ferromagnetic hexagonal ferrite particles have the $SrFe_{12}O_{19}$, Co-2Y, Mg-2Y, Zn/Co-2Y, or Zn/Mg-2Y or combinations thereof.

5. The composition of claim 1, wherein the particles are on a surface of the matrix material.

6. The composition of claim 1, wherein the particles are embedded in the matrix material.

7. The composition of claim 1, wherein the Curie temperature is from about 100° to 450° C.

8. The composition of claim 1, wherein the particles are from about 1 micron to about 840 microns.

9. The composition of claim 1, wherein the particles are present from about 1% to about 50% by volume.

10. The composition of claim 9, wherein the particles are from about 10% to about 30% by volume.

11. The composition of claim 10, wherein the particles are present from about 15% to about 20% by volume.

12. The composition of claim 1, wherein the matrix material comprises a thermoplastic material.

13. The composition of claim 12, wherein the thermoplastic material comprises poly(etheretherketone), polyetherketoneketone, poly(etherimide), polyphenylene sulfide, poly(sulfone), polyethylene terephthalate, polyester, polyamide, polypropylene, polyurethane, polyphenylene oxide, polycarbonate, polypropylene/polyamide, polypropylene/ethylene vinyl alcohol, polyethylene or combinations thereof.

14. The composition of claim 1, wherein $T_c$ of the particles is less than the melting temperature of the matrix material.

15. The composition of claim 1, wherein $T_c$ of the particles is greater than the melting temperature of the matrix material.

16. A composition for controlling temperature induction heating comprising a matrix material and ferromagnetic soft electrically non-conductive ferrite particles, where the ferrite particles are greater than or equal to about 1 micron in size and have a specific Curie temperature ($T_c$) in the matrix material and wherein the specific Curie temperature is substantially similar to a processing temperature of the matrix material.

17. The composition of claim 16, wherein the particles have the composition $1Me_bO:1Fe_2O_3$, where $Me_bO$ is a transition metal oxide.

18. The composition of claim 17, wherein the $Me_b$ is selected from Cu, Ni, Go, Mn, and Zn.

19. The composition of claim 17, wherein the matrix material comprises a thermoplastic material.

20. The composition of claim 19, wherein the thermoplastic material comprises poly(etheretherketone), polyetherketoneketone, poly(etherimide), polyphenylene sulfide, poly(sulfone), polyethylene terephthalate, polyester, polyamide, polypropylene, polyurethane, polyphenylene oxide, polycarbonate, polypropylene/polyamide, polypropylene/ethylene vinyl alcohol, polyethylene or combinations thereof.

21. The composition of claim 16, wherein $T_c$ of the particles is less than the melting temperature of the matrix material.

22. The composition of claim 16, wherein $T_c$ of the particles is greater than the melting temperature of the matrix material.

23. The composition of claim 16, wherein the particles are selected from (Mn, ZnO) $Fe_2O_3$ and (Ni, ZnO)$Fe_2O_3$.

24. A composite comprising a matrix and a susceptor included in the matrix for heating the matrix to a desired Curie temperature, wherein the specific Curie temperature is substantially similar to a processing temperature of the matrix material, wherein the susceptor comprises ferromagnetic, electrically non-conductive hexagonal ferrite particles, where the ferrite particles are greater than or equal to about 1 micron in size, wherein the particles have the composition $SrFe_{12}O_{19}$, $Me_a$-2W, $Me_a$-2Y and $Me_a$-2Z, wherein 2W is $BaO:2Me_aO:8Fe_2O_3$, 2Y is $2(BaO:Me_aO:3Fe_2O_3)$, and 2Z is $3BaO:2Me_aO:12Fe_2O_3$, and wherein $Me_a$ is a divalent cation or ferromagnetic soft electrically non-conductive ferrite particles, where the ferrite particles are greater than or equal to about 1 micron in size, wherein the particle have the composition $1Me_bO:1Fe_2O_3$, where $Me_bO$ is a transition metal oxide.

25. The composite of claim 24, wherein the matrix comprises a thermoplastic material.

26. The composite of claim 25, wherein the thermoplastic material comprises poly(etheretherketone), polyetherketoneketone, poly(etherimide), polyphenylene sulfide, poly(sulfone), polyethylene terephthalate, polyester, polyamide, polypropylene, polyurethane, polyphenylene oxide, polycarbonate, polypropylene/polyamide, polypropylene/ethylene vinyl alcohol, polyethylene or combinations thereof.

27. The composite of claim 24, wherein $Me_a$ comprises Mg, Go, Mn or Zn and $Me_b$ comprises Ni, Go, Mn, or Zn.

28. The composition of claim 2, wherein the ferrite particles are selected from the group consisting of $SrFe_{12}O_{19}$, Co-2Y, and Mg-2Y, and wherein zinc is partially substituted for the divalent ions of the ferrite particles.

29. The composition of claim 28, wherein zinc is about 15% substituted for the divalent ions of the ferrite particles.

30. The composite of claim 24, wherein ferrite particles are selected from the group consisting of $SrFe_{12}O_{19}$, Co-2Y, and Mg-2Y, and wherein zinc is partially substituted for the divalent ions of the ferrite particles.

31. The composite of claim 30, wherein zinc is about 15% substituted for the divalent ions of the ferrite particles.

32. The composition of claim 16, wherein the particles are on a surface of the matrix material.

33. The composition of claim 16, wherein the particles are embedded in the matrix material.

34. The composition of claim 16, wherein the curie temperature is from about 100° to 450° C.

35. The composition of claim 16, wherein the particles are from about 1 micron to about 840 microns.

36. The composition of claim 16, wherein the particles are present from about 1% to about 50% by volume.

37. The composition of claim 36, wherein the particles are from about 10% to about 30% by volume.

38. The composition of claim 36, wherein the particles are present from about 15% to about 20% by volume.

39. The composition of claim 1, wherein the composition is capable of being heated to the Curie temperature by applying a magnetic field to the composition at a frequency of about 80 kHz to about 30 MHz.

40. The composition of claim 16, wherein the composition is capable of being heated to the Curie temperature by applying a magnetic field to the composition at a frequency of about 80 khz to about 30 MHz.

41. The composition of claim 24, wherein the composite is capable of being heated to the Curie temperature by applying a magnetic field to the composition at a frequency of about 80 kHz to about 30 MHz.

* * * * *